United States Patent
Sims et al.

(10) Patent No.: US 11,534,701 B2
(45) Date of Patent: Dec. 27, 2022

(54) FLUID DEGASSING CONTROL SYSTEM

(71) Applicant: IDEX Health & Science LLC, Rohnert Park, CA (US)

(72) Inventors: Carl Sims, Rohnert park, CA (US); Quan Liu, Petaluma, CA (US); David Wert, Petaluma, CA (US)

(73) Assignee: IDEX Health & Science, LLC, Rohnert Park, CA (US)

(*) Notice: Subject to any disclaimer, the term of this patent is extended or adjusted under 35 U.S.C. 154(b) by 0 days.

(21) Appl. No.: 16/697,655

(22) Filed: Nov. 27, 2019

(65) Prior Publication Data

US 2020/0164286 A1 May 28, 2020

Related U.S. Application Data

(60) Provisional application No. 62/772,601, filed on Nov. 28, 2018.

(51) Int. Cl.
*B01D 19/00* (2006.01)
*B01D 15/16* (2006.01)

(52) U.S. Cl.
CPC ....... *B01D 19/0063* (2013.01); *B01D 15/166* (2013.01); *B01D 19/0031* (2013.01)

(58) Field of Classification Search
CPC .............. B01D 19/00–0495; B01D 15/166
USPC ................................. 95/22, 43–56
See application file for complete search history.

(56) References Cited

U.S. PATENT DOCUMENTS

| | | | |
|---|---|---|---|
| 5,885,332 A | 3/1999 | Gerner et al. | |
| 6,248,157 B1 | 6/2001 | Sims et al. | |
| 6,258,154 B1* | 7/2001 | Berndt | B01D 19/0031 95/46 |
| 6,309,444 B1 | 10/2001 | Sims et al. | |
| 6,366,300 B1* | 4/2002 | Ohara | G05B 19/056 700/83 |
| 6,494,938 B2 | 12/2002 | Sims et al. | |
| 6,675,835 B2 | 1/2004 | Gerner et al. | |
| 6,949,132 B2 | 9/2005 | Thielen et al. | |
| 7,713,331 B2 | 5/2010 | Gerner et al. | |
| 7,947,112 B1* | 5/2011 | Gerner | B01D 19/0063 95/47 |
| 9,700,816 B2 | 7/2017 | Liu et al. | |
| 10,143,942 B2 | 12/2018 | Liu et al. | |
| 11,111,911 B2 | 9/2021 | Richter et al. | |

(Continued)

FOREIGN PATENT DOCUMENTS

WO 2018085892 5/2018
WO 2018085892 A1 5/2018

OTHER PUBLICATIONS

Tokunaga, J Chem & Eng Data, vol. 20, No. 1, 1975.

(Continued)

*Primary Examiner* — Christopher P Jones
*Assistant Examiner* — Phillip Y Shao
(74) *Attorney, Agent, or Firm* — Haugen Law Firm PLLP

(57) ABSTRACT

A membrane-based fluid degassing system is arranged for automated control to a degassing efficiency set point, so that fluid is degassed only as necessary. The control variable may be assigned as the degassing environment, to provide the gas transfer driving force suitable to appropriately degas the fluid. By avoiding unnecessary degassing of the fluid, mobile phase pervaporation through the membrane is minimized.

11 Claims, 18 Drawing Sheets

(56) References Cited

U.S. PATENT DOCUMENTS

| | | | |
|---|---|---|---|
| 2008/0006578 A1* | 1/2008 | Sims | G01N 30/28 |
| | | | 210/639 |
| 2008/0142441 A1* | 6/2008 | Pashley | B01D 19/0031 |
| | | | 210/640 |
| 2011/0214571 A1 | 9/2011 | Berndt | |
| 2016/0114264 A1* | 4/2016 | Liu | B01D 69/046 |
| | | | 96/6 |
| 2016/0166752 A1* | 6/2016 | Meyer | B01D 19/0031 |
| | | | 95/12 |
| 2017/0120164 A1* | 5/2017 | Chen | B01D 19/0063 |
| 2019/0232230 A1 | 8/2019 | Richter et al. | |
| 2020/0038778 A1 | 2/2020 | Schwan et al. | |

OTHER PUBLICATIONS

United Kingdom Intellectual Property Office Search Report dated Jun. 4, 2021 in United Kingdom patent application No. GB1917390.5.

Examination Report issued by the United Kingdom Intellectual Property Office dated Jun. 8, 2022 in United Kingdom patent application No. GB1917390.5.

* cited by examiner

FLUID DEGASSING CONTROL SYSTEM

CROSS-REFERENCE TO RELATED APPLICATIONS

This application claims the benefit of priority based on U.S. Provisional Patent Application Ser. No. 62/772,601, filed Nov. 28, 2018 and entitled "Fluid Degassing Control System", the content of which being incorporated herein in its entirety.

FIELD OF THE INVENTION

The present invention relates to fluid degassing generally, and more particularly to vacuum degassing systems that may be controlled to yield constant dissolved gas concentrations below an outgassing threshold while simultaneously limiting solvent pervaporation through a degassing membrane.

BACKGROUND OF THE INVENTION

Many applications utilizing fluids such as liquid solvents and aqueous solutions containing dissolved solids require highly accurate and metered delivery of fluids. As solutions and solvents are generally stored at atmospheric pressure in contact with air, the solutions and solvents become saturated with dissolved air. In the case of dispensing systems, dissolved air can form bubbles within connecting lines, syringes, pumps and detection means as conditions such as temperature and pressure change as the fluid passes through the system. In many systems such as those in clinical analyzers, bubble monitors are used to monitor a dispensed fluid to detect a bubble passing into a volume critical region. A software program may then be triggered to divert the fluid to a waste position, and to then purge the system and re-start the fluid dispensation. If the fluid is a reagent used in a chemical reaction, repeated dispensing of the reagent is both time consuming and costly.

In analytical chemistry, particularly High Pressure Liquid Chromatography (HPLC), it has long been known that the reduction of dissolved air from the mobile phase is of critical importance to the stability of system flow rate and, accordingly, to the proper identification of compounds separated by the HPLC system. Also important to HPLC is the degassing of mobile phase solvents that are blended together using multiple solenoid valves prior to introduction into the inlet of the HPLC pump. This form of HPLC pump design is referred to as "low pressure mixing" in which the HPLC system controller opens and closes solenoid valves associated with each solvent during the intake stroke of the HPLC pump to effect a solvent mixture necessary for developing a chromatogram by the HPLC system. Such low pressure mixing systems are only possible using degassed solvents since the formation of bubbles upon the immediate mixing of the proportioned solvents would otherwise prevent the formation of an accurate solvent composition. An examination into the effect of the change in capacity of a water and alcohol mixture at various concentrations for dissolved oxygen and nitrogen (air) is discussed in Tokunaga, J Chem & Eng Data, Vol 20, No 1, 1975. Converting the molar ratios utilized in Tokunaga's study to percent residual air yields the chart of FIG. 1. The work of Tokunaga demonstrated the degree to which methanol and water mixtures must be degassed in order to prevent bubble formation at mixing ("outgassing"), and form the foundation for in-line degassing for HPLC solvent mixtures used today. Although the chart of FIG. 1 addresses only methanol and water mixtures, the data has proven to be adequate for all known solvent combinations in use by HPLC systems today, where solvents are combined to form either an isocratic mixture or to form a gradient.

FIG. 1 shows an example mobile phase represented wherein water is mixed with methanol in various ratios. The vertical axis is the amount of air contained within an air saturated water and in methanol at standard temperature and pressure. The difference between the upper solid line and the Ostwald coefficient data line represents the supersaturation which would occur and cause outgassing if the solutions are not degassed. The Ostwald coefficient data line represents the maximum amount of air that mixtures of methanol and water can contain.

Three data lines are presented which represent the effect of degassing both methanol and water to a specific residual concentration of dissolved air (as compared to saturation at atmospheric pressure). The upper dashed line represents the amount of air delivered to a mixture of water and methanol wherein both are degassed to 60% residual of air saturation. Note that between approximately 15% methanol in water and 85% methanol in water, there remains a significant amount of oversaturation of the mixtures with air. As with non-degassed solvents, an oversaturation condition would result in outgassing of air during the mixing of the two solvents as they enter the HPLC pump inlet in a low-pressure mixing system.

The middle dash-dot line represents a 40% residual air in each water and methanol. Water and methanol degassed to this level have only a slight over-saturation in mixtures of between 35% and 60% methanol with water.

Finally, the lower dotted line represents the amount of air contributed to mixtures of methanol and water where both are degassed to 25% of the atmospheric level of saturation. It can be seen that no over-saturation condition occurs at this degassed air concentration, wherein no outgassing could occur upon the mixing of methanol and water at any ratio. The actual concentration of air in the mixtures which will not outgas at atmospheric conditions is 38%.

For the purposes hereof, the term "efficiency" is the inverse of residual gas, pursuant to the following formula where efficiency=100%−% residual gas. In the case of 38% residual air, the degassing efficiency is 62% (100%−38%).

Tokunaga's data for methanol and water mixtures has been the standard by which degassing for all solvents and mixtures are determined for HPLC. The effect of over-saturation of the mixtures of solvents has been found empirically to have a similar supersaturation as that of the above methanol-water mixture. Since HPLC systems are designed for general use, the degassing system installed into the instrument must perform across the broad range of solvents used in HPLC. Methanol-water solutions have been determined empirically to be the most demanding of a degasser, and are thus the standard by which degassers are designed.

Bubble formation during the intake stroke on an HPLC pump may be limited or prevented by suitable degassing of the mobile phase. Typical HPLC pumps contain a check valve at the inlet, wherein cavitation during the intake stroke may lower the local pressure within the pump chamber to a point at which a gas-saturated solvent will form bubbles. Such bubble formation can prevent the check valve from properly sealing when the pump piston compresses the fluid contained in the pumping chamber. Improper check valve sealing may completely stop the pumping action and therefore prevent the chromatograph from operating. Any small degradation of the performance of the pumping system caused by bubbles is highly undesirable and must be eliminated by sufficiently degassing the solvents so that cavitation within the pumping system does not occur. For this reason, a low flow restriction in each of the proportioning valve system, the degassing chamber, and connection tubing is desired.

In the case of high pressure mixing HPLC, two or more high pressure pumps are typically used with a variable pumping rate to form a predetermined mixture of solvents at a Tee junction upstream from the injection system and HPLC column. Since such solvent mixing occurs at the outlet of the pumps, the system pressure is sufficiently high to prevent bubble formation at the mixing point or through the HPLC separation column. Degassing solvent supplied to these HPLC systems ahead of each pump may be used to eliminate cavitation during the intake stroke of the pump and to eliminate outgassing in a detector operating downstream from the outlet of the HPLC column.

In addition to preventing cavitation in both high-pressure and low-pressure mixing type HPLC systems, mobile phase degassing may also prevent undesired effects at the detector. Mass spectrometric detection requires a smooth, continuous flow of solvent into the nebulizer, which solvent flow can be interrupted by bubbles exiting the column when the solvent is improperly degassed. Moreover, detection of fluorescent compounds eluting from the HPLC column can be quenched by the presence of oxygen in the mobile phase. Background absorbance of solvents such as alcohols, tetrahydrofuran and others can interfere with accurate analyte assessment, and such background absorbance may be mitigated by reducing the concentration of oxygen in the mobile phase to a constant value. In analyses wherein the amount of oxygen present in the system affects detection, control of the concentration of dissolved oxygen to a constant value is beneficial.

Liquid degassing utilizing tubular gas/liquid separation membrane structures for conducting fluid through a degassing chamber have been described previously in, for example, U.S. Pat. Nos. 6,248,157, 6,309,444, 5,885,332, 6,675,835, 7,713,331, 6,949,132, 6,494,938, and 10,143,942, assigned to the present assignee and herein incorporated by reference.

A gas-liquid contactor as it is commonly applied in the field of High Pressure Liquid Chromatography (HPLC) or Liquid Chromatography (LC) is configured such that a first (retentate) side of an inert, gas permeable membrane is in contact with an HPLC mobile phase (mobile phase) comprised of a solvent, or a mixture of solvents, while the opposite, second (permeate) side of the membrane is in contact with a gas that may be at reduced atmospheric pressure (a vacuum). The function of the membrane is to allow diffusion of atmospheric gas dissolved in the mobile phase into the permeate side of the membrane in a manner consistent with Henry's law and Dalton's law wherein the membrane itself behaves according to Fick's law of diffusion. Of particular interest in the field of HPLC mobile phase degassing is the role of the membrane in selectively allowing atmospheric fixed gasses such as oxygen, nitrogen and carbon dioxide which may be dissolved in the mobile phase to pass through the membrane while restricting the movement of the desired liquid components of the mobile phase from passing through the membrane. Such restriction of movement is commonly referred to as the selectivity of the membrane. It is therefore desirable to select a membrane material which allows the passage of these fixed gasses to the exclusion of the liquid components of the mobile phase.

In addition to gasses diffusing through the membrane, the solvents themselves can pervaporate through the membrane. Pervaporation effects are particularly damaging to analytical accuracy in chromatographic systems utilizing relatively low through-put mobile phase volumes, or in instances wherein the chromatographic instrumentation is only periodically operated without complete flushing of supply lines between each operation. For example, systems that utilize mobile phase flow rates of on the order of nanoliters or microliters per hour are at risk of having pervaporation effects substantially impact analysis.

Liquid chromatography systems typically employ degassing chambers in which the liquid mobile phase is exposed to a degassing environment through a gas-permeable, liquid-impermeable membrane. Such a degassing environment may be, for example, relatively low absolute pressures maintained by evacuation pumps. Typically, degassing operations have been arranged and controlled to maximize degassing performance on the mobile phase passing through the degassing chamber. To do so, vacuum pumps were programmed to maintain very low absolute pressures on the permeate side of the membrane. The target gas concentration differential across the membrane has traditionally maintained a relatively high value to drive target gas transfer through the membrane. A result of maintaining such a large target gas differential at all times in the degassing chamber is solvent pervaporation through the membrane.

FIG. 2 is a plot of the vapor pressures of various HPLC solvents and several common mixtures of solvents used in HPLC. Pervaporation of solvents may be suppressed by characterizing a vacuum degassing system such that a constant, maximum dissolved gas concentration amount may be maintained. Such an approach is broadly applicable to degassing systems regardless of membrane type or performance characteristics. Maintaining a sufficient level of degassing and yet operating a degassing system to minimize pervaporation and subsequent concentration changes in the mobile phase contained within the vacuum degassing modules has heretofore remained an unsolved problem.

It is therefore an object of the present invention to provide a degassing system control that achieves a sufficient degree of degassing to meet performance parameters, but does not exceed such minimum degassing requirement, so that pervaporative effects are minimized or prevented altogether. In example embodiments, vacuum degassing systems may be controlled so that a maximum permeate side pressure suitable to achieve the assigned degassing performance is established and maintained throughout the mobile phase flow rate range of the degassing system.

Another object of the present invention is to control a degassing system to maintain a constant target residual gas concentration in a fluid being delivered to, for example, an HPLC pump.

A further object of the present invention is to provide a constant background optical characteristic of mobile phase being delivered to a detector.

SUMMARY OF THE INVENTION

By means of the present invention, fluid degassing systems may be operably controlled to effectuate a desired performance level while minimizing or preventing pervaporation through a degassing membrane. The control system utilizes degassing module performance characteristics to determine control parameters that equate degassing outcome and fluid flow rate set point values with suitable degassing chamber pressures that are sufficient to achieve the desired degassing outcome while minimizing pervaporation across the degassing membrane. The control parameter therefore dictates a maximum degassing chamber pressure at which the desired or default degassing performance threshold is met, thereby avoiding unnecessary pervaporation.

DETAILED DESCRIPTION OF THE INVENTION

The objects and advantages enumerated above together with other objects, features, and advances represented by the present invention will now be presented in terms of detailed embodiments described with reference to the attached drawing figures. Other embodiments and aspects of the invention are recognized as being within the grasp of those having ordinary skill in the art.

Figure 3:
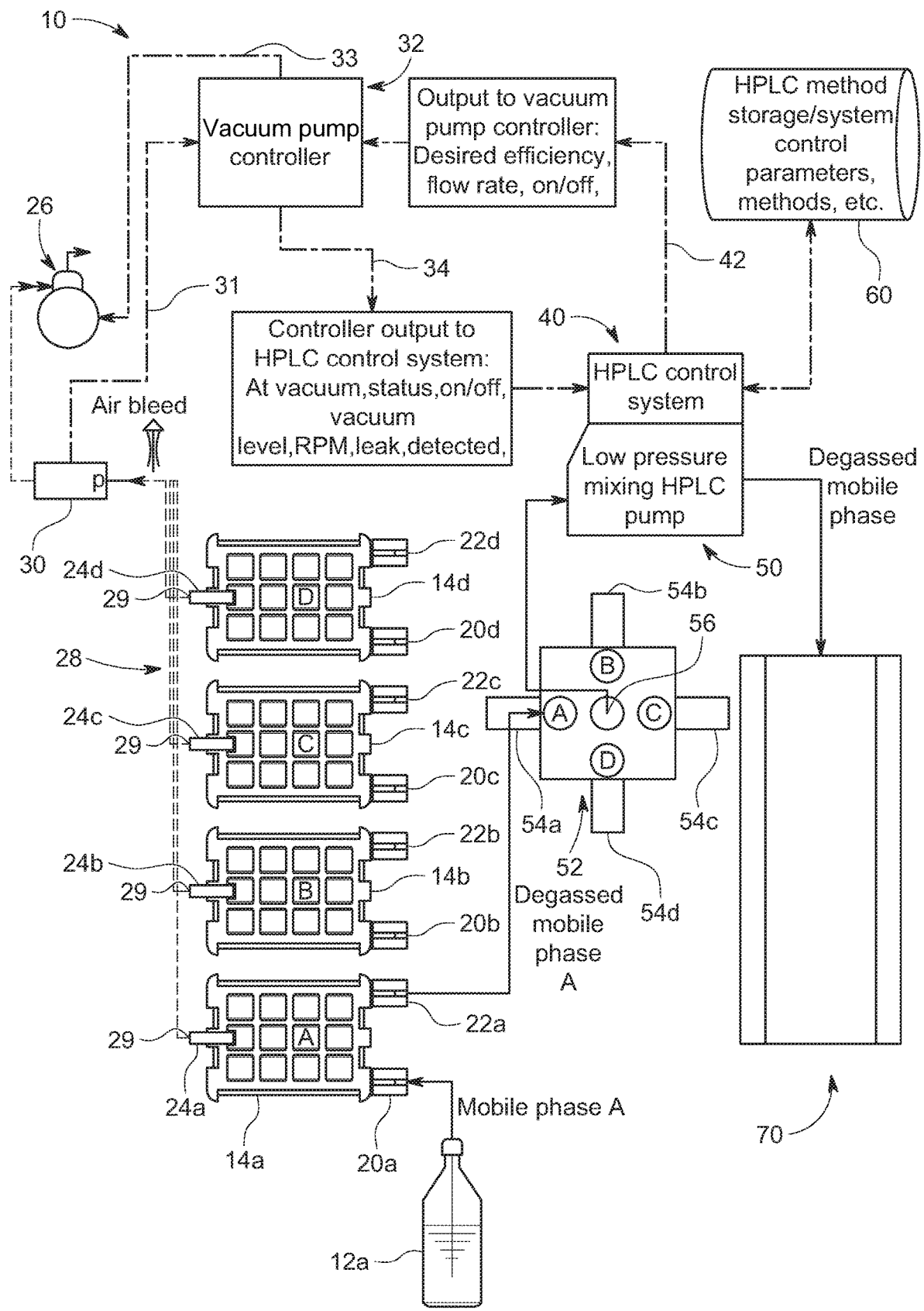
FIG. 3 is a schematic illustration of a chromatographic system with a degassing pressure control of the present invention.

An example chromatographic system is schematically illustrated in FIG. 3, which depicts in particular a low-pressure solvent mixing HPLC system designed for up to four distinct solvents mixed as a mobile phase for delivery to an HPLC separation module. HPLC system 10 is illustrated with a single mobile phase reservoir 12a for simplicity, but it is to be understood that HPLC system 10 may include a plurality of mobile phase reservoirs 12a-12x for fluid supply to each of the plurality of degassing modules 14a-14x.

Figure 4:
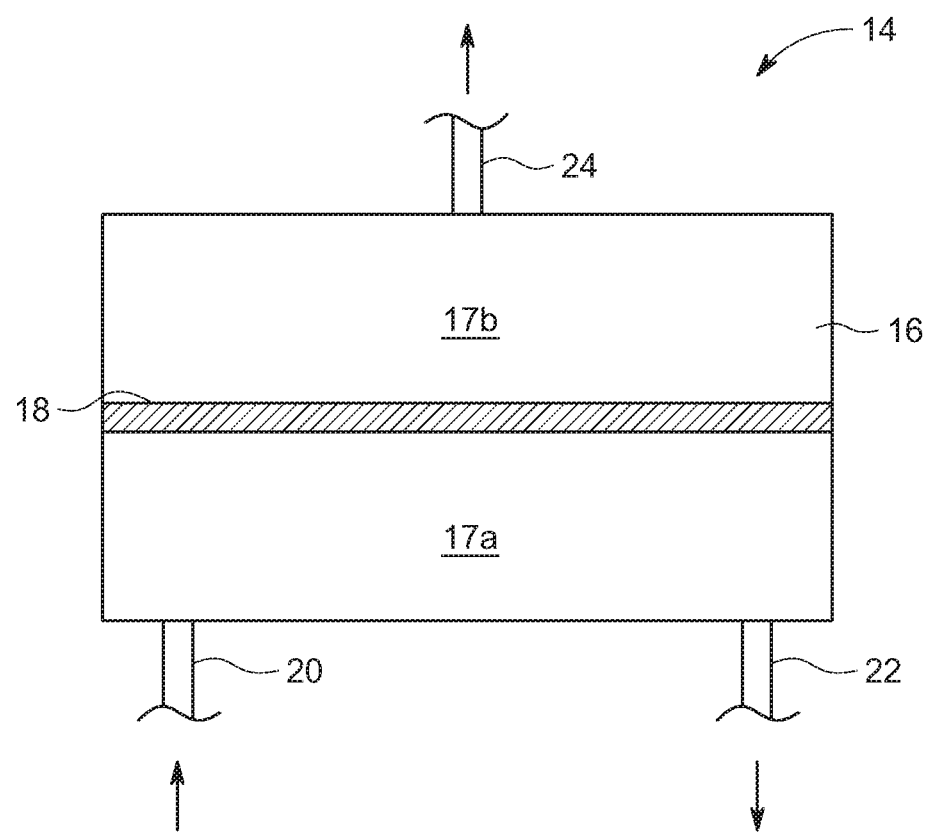
FIG. 4 is a is a schematic illustration of a fluid degassing module.

Each of the illustrated degassing modules 14a-14d includes, as schematically shown in FIG. 4, a chamber 16 and a gas-permeable, liquid-impermeable membrane 18 that separates chamber 16 into a retentate side 17a and a permeate side 17b. Each module 14a-14d further includes fluid inlet and outlet ports 20, 22 fluidically connected to the retentate side 17a of chamber 16, and an exhaust port 24 fluidically connected to permeate side 17b of chamber 16. A vacuum pump 26 may be fluidically connected to exhaust port 24 to at least partially evacuate permeate side 17b of each chamber 16 to a "permeate side" pressure. An example degassing module useful in HPLC system 10 is described in U.S. Pat. No. 10,143,942, which is assigned to the present assignee, and is herein incorporated by reference in its entirety.

A vacuum pump 26 may be fluidically connected to exhaust port 24 to at least partially evacuate permeate side 17b of each chamber 16. In the schematically illustrated embodiment of FIG. 3, each exhaust port 24a-24d is preferably fluidically connected to a vacuum manifold 28 to establish a common pathway between each exhaust port 24a-24d and vacuum pump 26. Vacuum manifold 28 may be a pipe with one or more connections 29 to the exhaust ports 24a-24d. In typical embodiments, vacuum manifold 28 permits equivalent pressures at each permeate side 17b of modules 14a-14d by forming an open conduit between each chamber 16 and vacuum pump 26. As described herein, vacuum pump 26 is preferably controlled to maintain a permeate side pressure at each chamber 16, to both ensure appropriate degassing performance, and to minimize solvent pervaporation through the membrane. To aid in the control of the permeate side pressure at each chamber 16, a vacuum sensor 30 may be positioned in the pathway between exhaust ports 24a-24d and vacuum pump 26 such as in vacuum manifold 28, or at any location at which the permeate side pressure at each module may be assessed. Pressure sensor 30 preferably sends a pressure level signal to a controller, such as a vacuum pump controller 32, which signal 31 indicates a pressure level in vacuum manifold 28, and by implication, permeate side 17b of each degassing chamber 16. Vacuum pump controller 32 processes signal 31 to compare the sensed pressure level to a pressure set point. A vacuum pump signal 33 may be generated by vacuum pump controller 32 and delivered to vacuum pump 26 to adjust an operating speed of vacuum pump 26, to thereby adjust pressure in vacuum manifold 28 responsive to the sensed pressure at pressure sensor 30. In the illustrated embodiment, vacuum pump controller 32 may also generate a report signal 34 to an HPLC controller 40 indicating status information of vacuum pump 26, such as operational status, operating speed, and so on. In some embodiments, pressure level data may also be delivered to HPLC controller 40 through report signal 34.

HPLC system 10 further includes a fluid pump 50 fluidically connected to respective outlet ports 22a-22d of degassing modules 14a-14d for motivating a respective mobile phase fluid through retentate side 17a of chamber 16. In the illustrated embodiment, the low-pressure mixing HPLC fluid pump 50 is fluidically connected to outlet ports 22a-22d through a proportioning valve 52 that may be operated to achieve a desired mobile phase blend of the respective mobile phase fluids A-D. Mobile phase fluids B-D are not illustrated in FIG. 3 for simplicity, but it is to be understood that each mobile phase/solvent may be directed through a respective degassing module 14a-14d, with the degassed mobile phase/solvent being pumped by fluid pump 50 through a respective inlet port 54a-54d of proportioning valve 52. The desired blended mobile phase may be withdrawn from outlet port 56 of proportioning valve 52 by the pumping action of fluid pump 50. HPLC controller 40 may be communicatively linked to fluid pump 50 to motivate the mobile phase at a target total flow rate, which may be assigned by an operator or may be set to a default or predetermined level or program. In the illustrated embodiment, HPLC controller 40 is also communicatively linked to vacuum pump 26 through vacuum pump controller 32. As will be described in greater detail hereinbelow, one or more databases 60 may be communicatively linked to one or more of vacuum pump controller 32 and HPLC controller 40, and may contain a control parameter that is useful for one or both of vacuum pump controller 32 and HPLC controller 40 to control HPLC system 10 to a desired degassing efficiency while minimizing pervaporation. In the illustrated embodiment, vacuum pump controller 32 and HPLC controller 40 may form at least a portion of a "control system" of the present invention. The control system may be comprised of various sensors, signal generators, processors, memory components, and communication components. It is contemplated that the control system of the present invention utilizes process condition set points and one or more control parameters to determine a degassing chamber environment that induces gas to pass through membrane 18 to permeate side 17*b*, and then to operate HPLC system 10 in a manner that achieves such an environment. In some embodiments, the environment necessary to induce gas transfer through membrane 18 is a reduced pressure at permeate side 17*b*, which creates a driving force for gas transfer pursuant to Henry's Law. Other environments for permeate side 17*b*, however, are contemplated for inducing the gas transfer through membrane 18. An example of such alternate environments includes a sweep fluid containing a lower concentration of the target gas than the fluid on the retentate side 17*a* of chamber 16.

The control parameter may comprise calibration data and/or calibration formulas specific to a class of degassing modules that have substantially identical physical and performance characteristics, in which class degassing modules 14*a*-14*d* are members. The calibration data and/or formulas may be stored in part or in whole in more than one database 60 that may be accessed by the control system. An example arrangement may include some or all calibration data and/or calibration formulas stored in a database 60 that is connected to one or more of degassing modules 14*a*-14*d*. The calibration data associated with one or more of degassing modules 14*a*-14*d* may therefore physically accompany the degassing modules. The calibration data and/or calibration formulas may instead or additionally be stored remotely from the control system, and accessed through communication links to HPLC system 10.

In some embodiments, HPLC system 10 includes an input means, such as a graphical user interface communicatively linked to HPLC controller 40 for inputting process condition set points. Such process condition set points may, in some embodiments, include one or more of a degassing efficiency and a fluid (mobile phase) flow rate. In other embodiments, however, HPLC controller 40 and/or vacuum pump controller 32 may be programmed with one or more predetermined/assigned process condition set points that are used in the control parameter to determine appropriate permeate-side pressures. HPLC controller 40 may utilize a processor that is programmed to apply the process condition set points to the control parameter to determine a maximum pressure set point for the permeate side 17*b* of chamber 16 that nevertheless permits the degassing modules 14*a*-14*d* to meet a pre-determined or selected degassing efficiency at a pre-determined or selected fluid flow rate through the module 14*a*-14*d*. HPLC controller may be adapted to generate and deliver a pressure control signal 42 to vacuum pump controller 32, and ultimately to vacuum pump 26, to maintain the maximum pressure set point at the permeate side 17*b* of chamber 16.

Fluid pump 50 directs the mixed and degassed mobile phase to one or more downstream HPLC components 70. Example HPLC components may include separation components such as chromatographic columns, valves, ovens, detectors, and the like.

Figure 5:
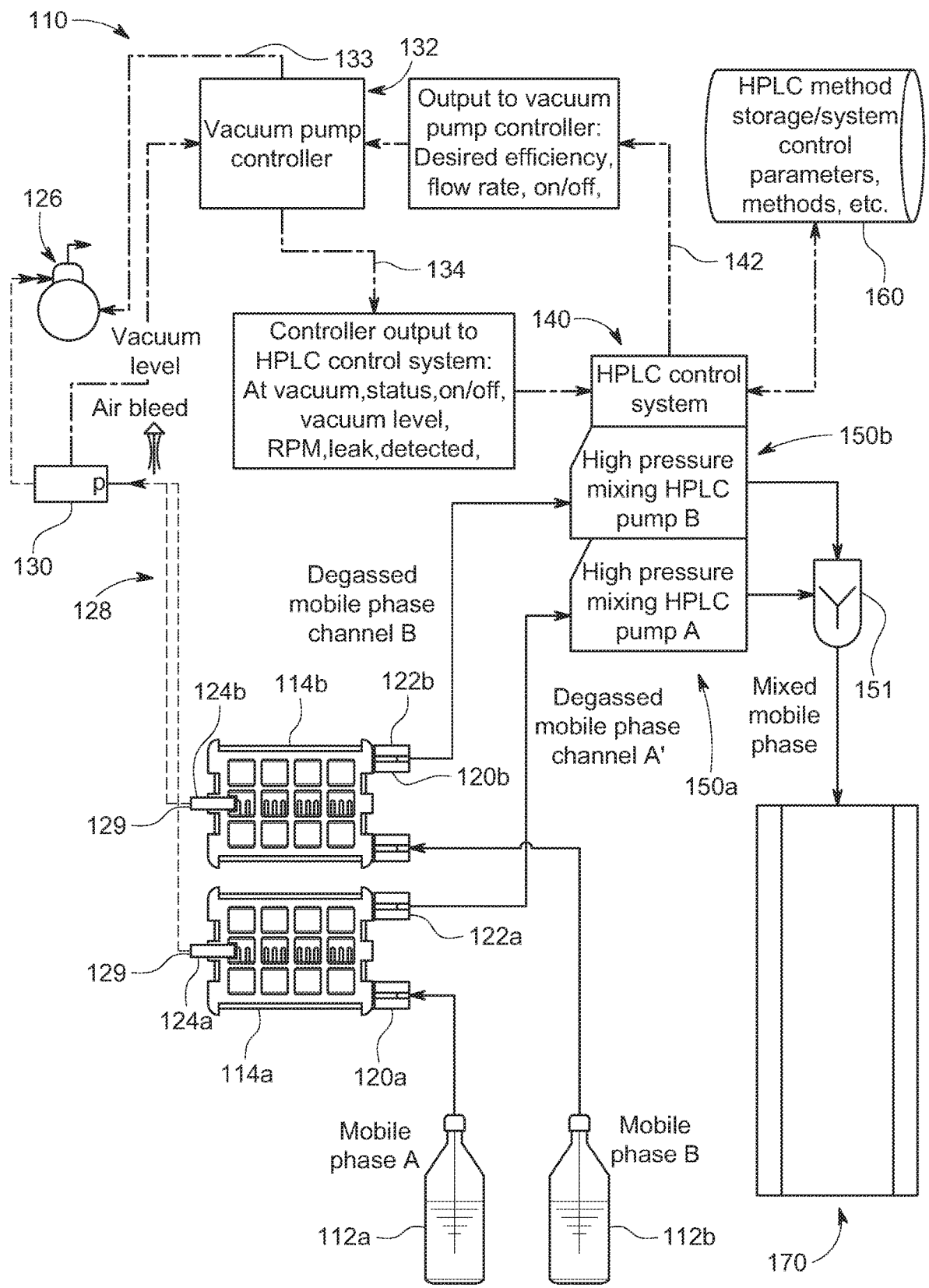
FIG. 5 is a schematic illustration of a chromatographic system with a degassing pressure control of the present invention.

FIG. 5 is a schematic illustration of another type of HPLC system 110 contemplated by the present invention. Such HPLC system 110 is known as a high pressure mixing system, wherein the output of two or more fluid pumps 150*a*, 150*b* operate in combination to produce an isocratic separation mixture, or to form a gradient. Fluid pumps 150*a*, 150*b* may typically be supplied by individual mobile phases which are pre-mixed before use at respective mobile phase reservoirs 112*a*, 112*b*. The flow rate from each fluid pump 150*a*, 150*b* may be varied such that the sum of flow from each fluid pump 150*a*, 150*b* is combined to produce a total desired mobile phase flow rate with a desired concentration of respective mobile phases. The remaining components of HPLC system 110 are similar to those described with reference to HPLC system 10, wherein like reference numerals represent like components.

The extent of degassing performed by each degassing module 14*a*-14*d* is determined by a number of factors, including the fluid flow rate through the retentate side 17*a* of the chamber 16, the driving force for gas transfer across membrane 18 presented by the environment in permeate side 17*b*, and the degassing performance characteristics of membrane 18, including its permeability characteristics and its contact surface area with the fluid. The applicant has discovered that the degassing performance for each degassing module may be defined, so that an extent of degassing (efficiency) may be controlled across a range of fluid flow rates through the control of the degassing driving force presented at permeate side 17*b* of chamber 16. More particularly, the applicant has discovered that an intentional control of the degassing driving force across membrane 18 may be tuned to prevent "over degassing", wherein mobile phase fluid may be sufficiently degassed to meet defined requirements, such as the avoidance of outgassing, while simultaneously minimizing or eliminating solvent pervaporation through the membrane. In an example system, such as HPLC systems 10, 110, the degassing driving force is effectuated by a reduced pressure environment at permeate side 17*b* of chamber 16, such that degasification of the fluid occurs through Henry's Law, with the target gas being driven through separation membrane 18 toward a lower partial pressure of such gas at permeate side 17*b*. Thus, the total pressure at permeate side 17*b* may be controlled through the application of an evacuating vacuum pump to a level suitable to satisfy a control parameter defined by the performance characteristics of the respective degassing modules 14*a*-14*d*.

Figure 1:
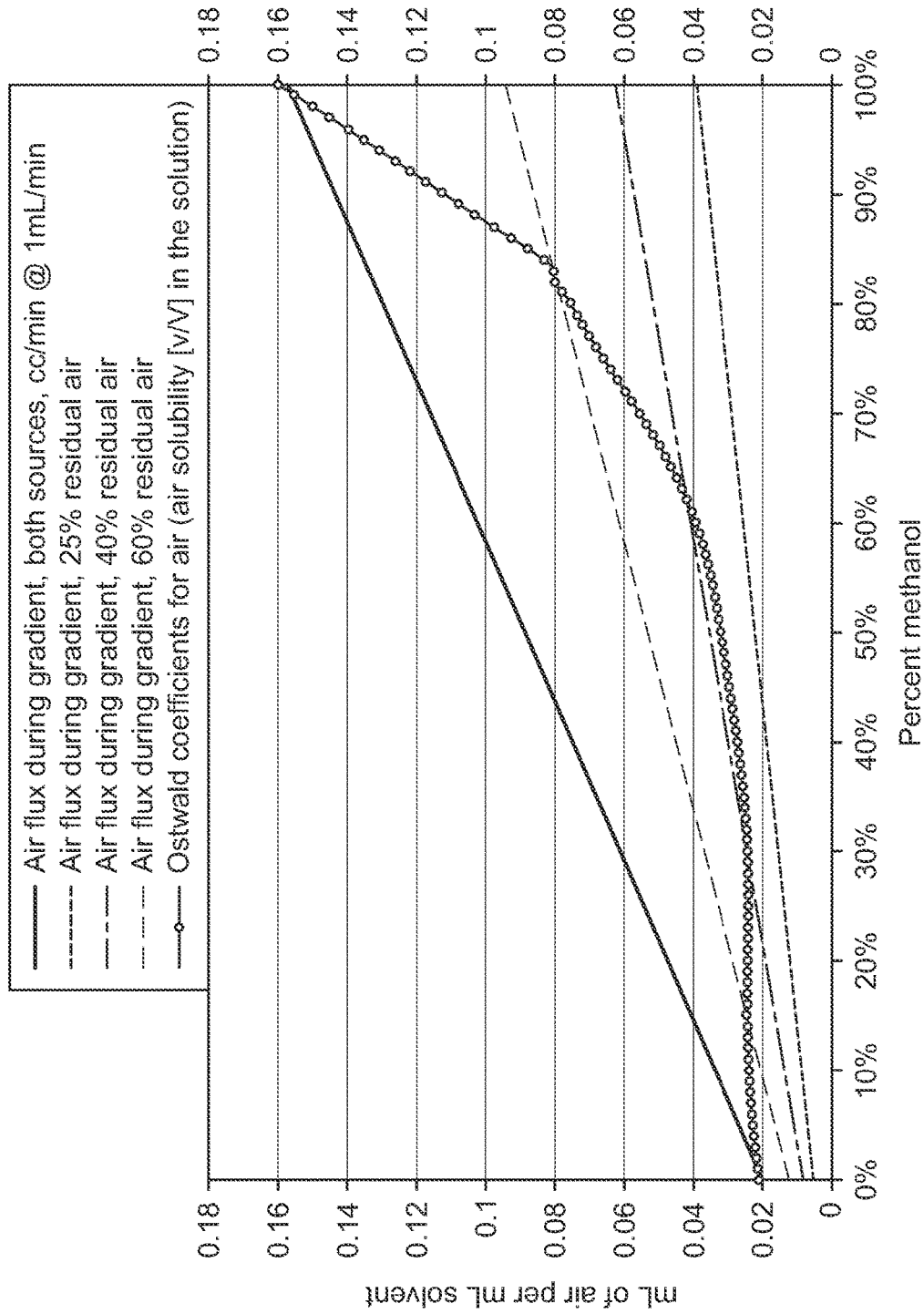
FIG. 1 is a chart of air solubility in various water/methanol mixtures.
Figure 2:
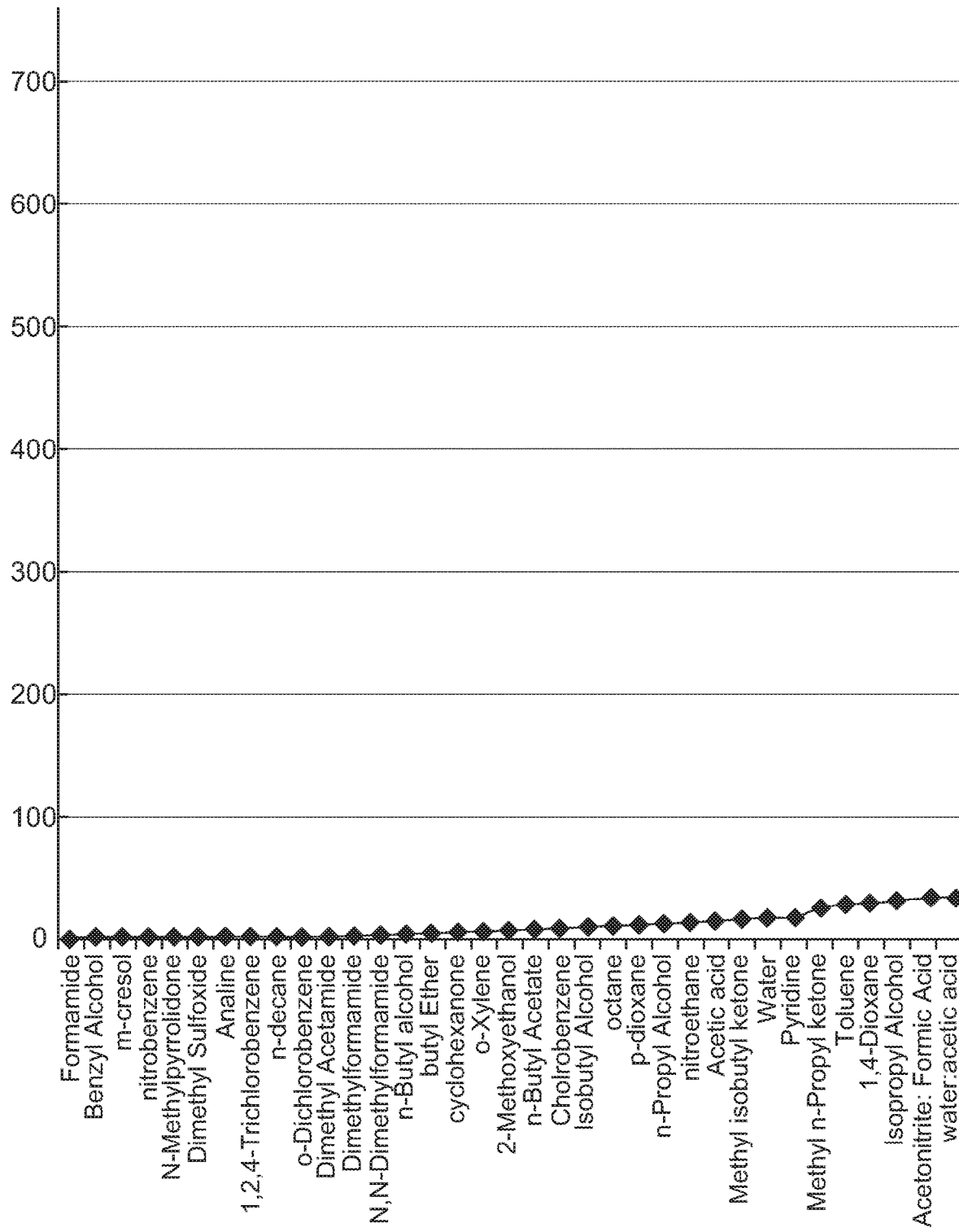
FIG. 2 is a plot of typical solvent vapor pressures.
Figure 2:
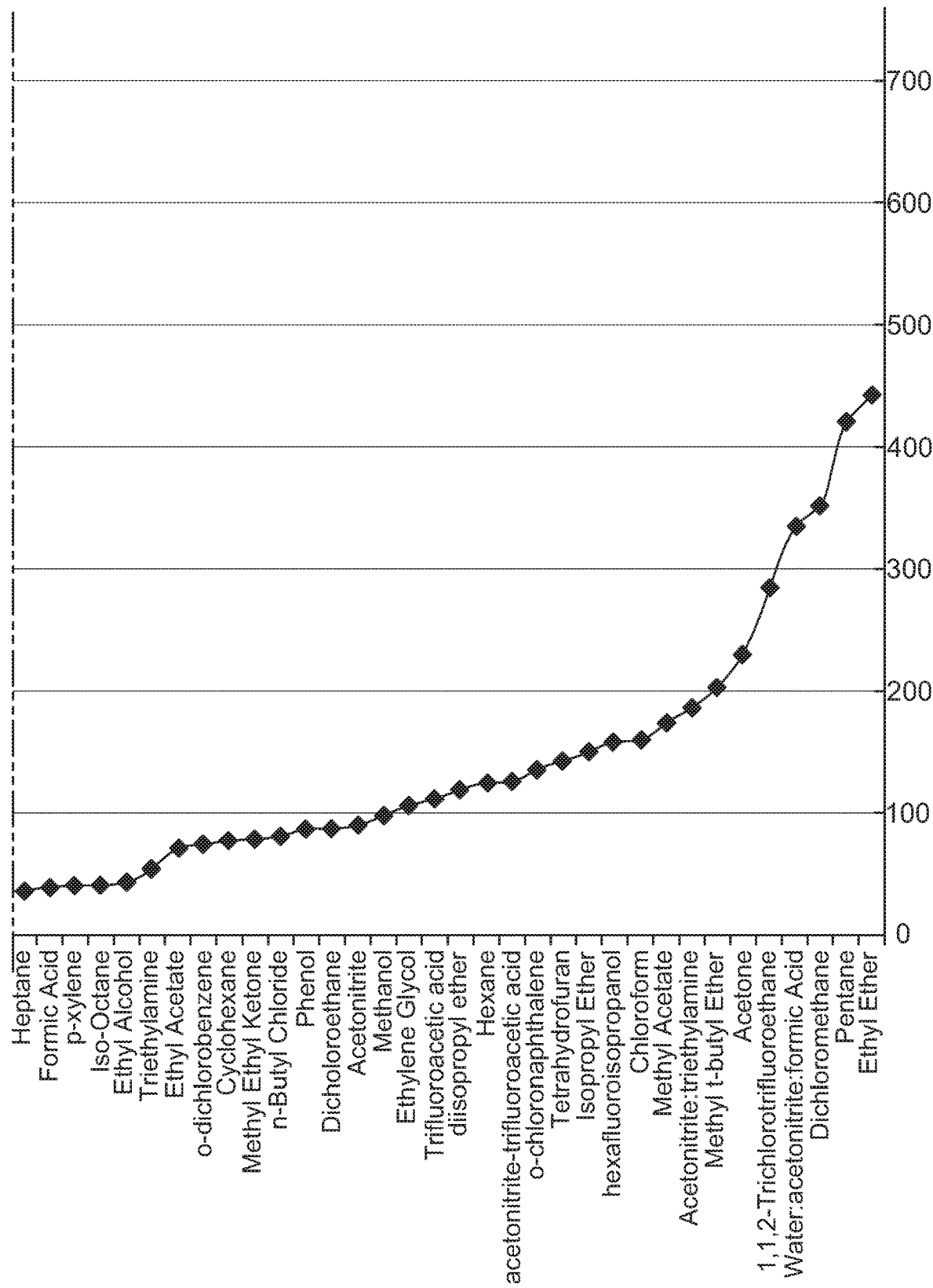

Based upon the data supplied by Tokunaga, and set forth in FIG. 1, mobile phases degassed to an extent of less than or equal to 38% residual gas will not outgas at atmospheric pressure. It has been discovered that the changes in degasser performance may be predictably used to vary the applied vacuum (reduced pressure) so that a constant target gas concentration (such as 38%) may be obtained at any flow rate depending on the range of permeate side pressures available, and the physical characteristics of membrane 18 and chamber 16.

Commercial HPLC systems are designed with degassers which have sufficient surface area and which operate at an applied vacuum sufficient to properly degas a mixture of mobile phases such that outgassing does not occur at the manufacturer's designed maximum effective flow rate. The target maximum effective chromatographic flow rate depends on the purpose of the individual HPLC and may not be the maximum flow rate at which the HPLC pump or pumps can operate. It is also typically desired by the instrument manufacturer that such performance be obtained wherein the amount of volume of mobile phase contained within any individual degasser channel be as small as is possible. Typically, the volume contained within a single degassing channel capable of performing to the maximum target flow rate of an HPLC is between 400 microliters and 1 milliliter.

Increasingly, HPLC systems include the ability to operate at flow rates from about 100 microliters per minute to 10 milliliters per minute. The degassing system of such an HPLC system must also operate effectively across this broad range of flow rates to supply properly degassed solvents that will not outgas upon mixing. The performance of a particular degasser is typically specified by the manufacturer of the HPLC system to remove sufficient dissolved gas at the highest designed chromatographic separation flow rate to prevent outgassing. Low flow rate chromatographic separations on the same instrument therefore "over degas" the fluid, given the relatively high residence time in the degassing chamber.

The presently proposed approach requires knowledge of the performance of any particular degasser design across a range of permeate side pressure, such that the HPLC pumping system may be supplied with mobile phase constituents at a maximum defined threshold of dissolved gas, such as a maximum dissolved gas concentration that does not exceed the level at which outgassing could occur. To do so, the applied vacuum (pressure) level may be adjusted as a function of flow rate in combination with characterization of the degassing module.

Degassing Module Calibration Testing

The performance of any particular degassing module design is determined by testing the module at a number of flow rates and a number of permeate side pressures using a standard methanol absorbance method. An ultraviolet light detector may be set to 210 nanometers to determine the amount of residual air in 100% methanol. As methanol forms a known charge transfer complex with oxygen present in the dissolved gas, emitted ultraviolet light is absorbed. The absorbance is used as an indicator of the total amount of dissolved atmospheric gasses. Calibration for zero concentration of oxygen, and therefore air, is done by helium or nitrogen sparging the test methanol until the ultraviolet light passing through the HPLC flow cell reaches a minimum absorbance $A_{zero}$. The detector is then zeroed and not adjusted thereafter.

A 100% atmospheric saturation concentration is then established by sparging the same methanol mobile phase with compressed air from a compressor or air source of a known, unchanging concentration. In a like manner, 100% saturation is established when the absorbance of methanol passing through the detector cell at the same wavelength reaches a maximum. The absorbance $A_{satd}$ reading is then said to represent 100% saturated for the methanol mobile phase.

A test degassing module is then placed between the air-saturated methanol reservoir and the inlet of the HPLC pump, and a test vacuum is applied to the permeate side of the module chamber. The HPLC pumping system is set to deliver various flow rates of methanol and the UV absorbance of the methanol passing through the HPLC detector is then recorded ($A_{degassed}$). The ratio of the absorbance of the methanol passing through the test degassing module to the non-degassed air-saturated absorbance ($A_{degassed}$ to $A_{satd}$) and the flow rate and permeate side pressure are recorded. This method exercised across various flow rates produces calibration data that may be plotted as a performance curve against the flow rate.

Figure 6:
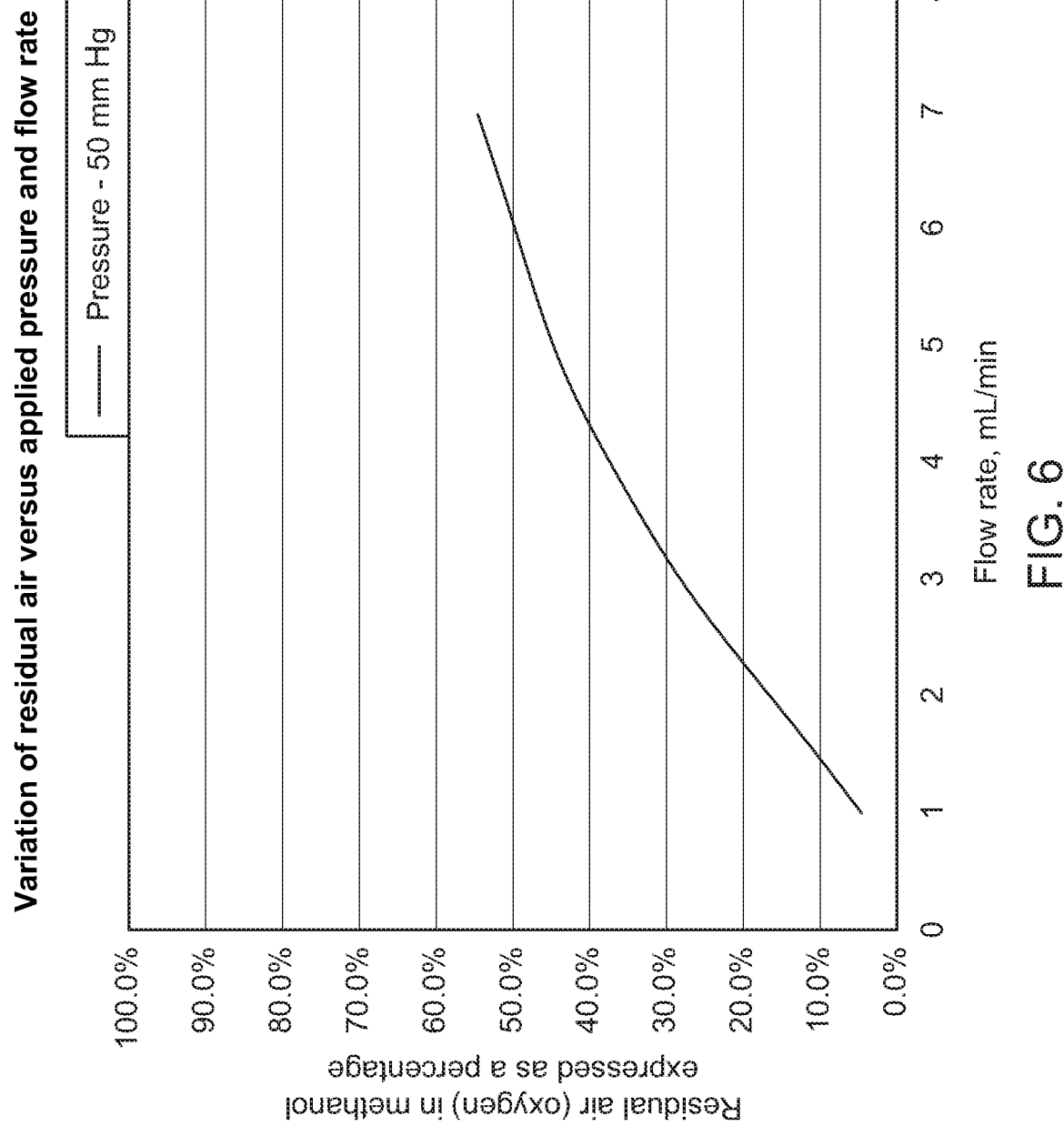
FIG. 6 is a chart showing a degassing performance curve for an example fluid degassing module.

A typical performance curve for residual air is illustrated in FIG. 6.

Figure 7:
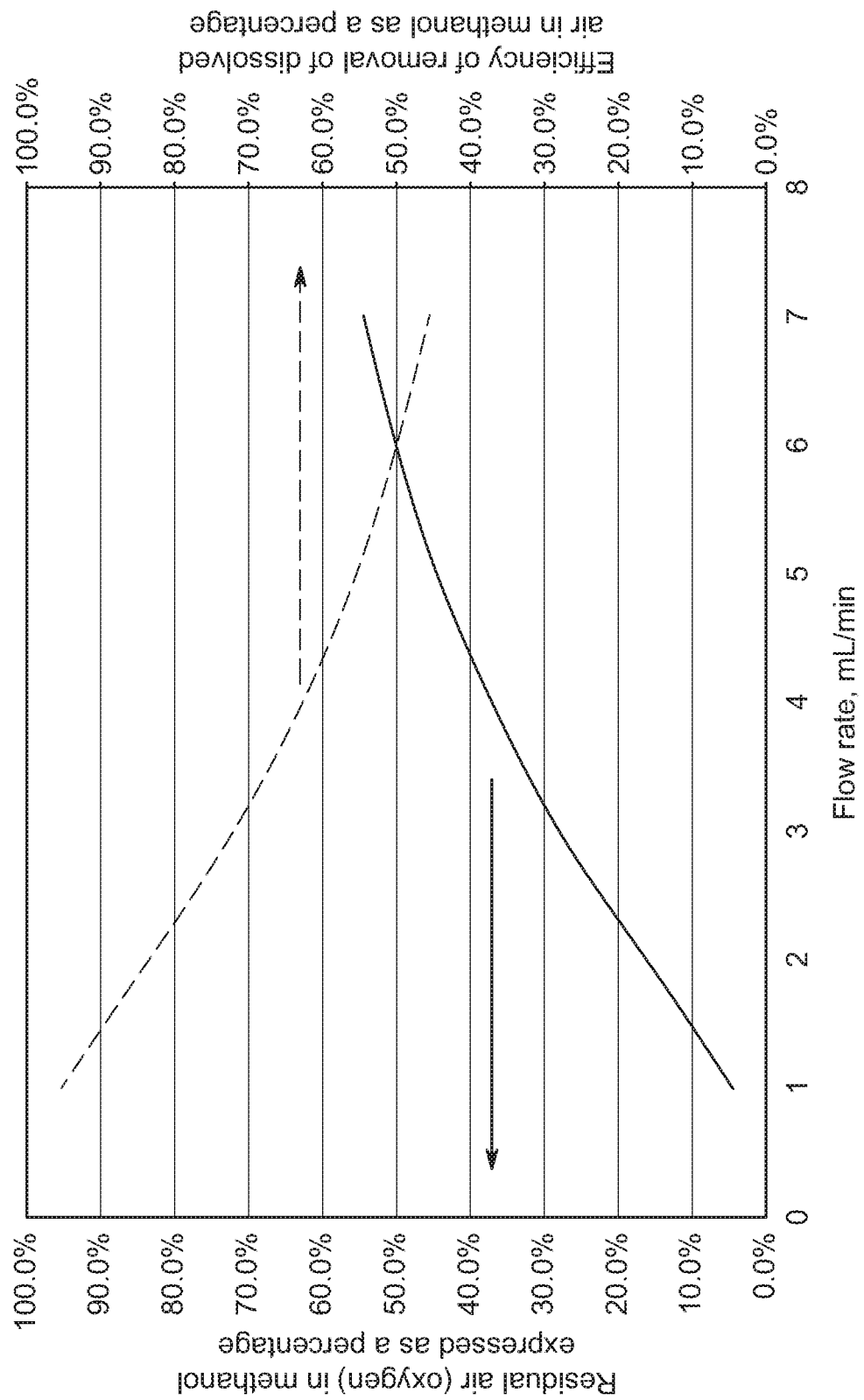
FIG. 7 is a chart showing both a degassing performance curve and an efficiency curve for the example fluid degassing module.

The calibration data is may also be presented in terms of "Efficiency", which is the inverse of concentration of residual gas (100%–% residual gas). FIG. 7 illustrates both types of calibration curves.

FIG. 7 demonstrates that, for the tested degassing chamber, the maximum mobile phase flow rate achievable without violating the upper limit from FIG. 1 of 38% residual air or falling below 62% efficiency before outgassing using the tested degassing chambers, through the range of mixtures is approximately 4 mL/min per channel. In an HPLC gradient, therefore, the total flow rate of methanol and water combined wherein each is degassed in a single channel is the sum of both channels, or approximately 8 mL/min.

The efficiency curve or residual air curve in FIG. 7 therefore demonstrates that mobile phases, as exemplified by methanol, passing through the degassing chamber at flow rates below 4 mL/min tend to contain less dissolved air than that which simply affects the system mechanically by outgassing after mixing. Flow rates below the designed upper flow rate performance therefore can be referred to as being "over-degassed". The present system for degassing control would, in such conditions, increase the permeate-side pressure so that the fluid is not unnecessarily degassed.

There may be reasons when using an HPLC detector sensitive to the fixed gas load in the mobile phase to operate a degasser such that the residual gas concentration is below a maximum concentration that avoids outgassing. For example, a mass spectrometer nebulizer may develop an irregular spray from the nebulizer based on the amount of dissolved gas in the mobile phase affecting quantitative or qualitative analysis. For this reason, a vacuum degassing system connected to the HPLC may desirably be operated to remove as much dissolved gas as possible from the mobile phase.

The present approach controls the degassing driving force based on flow rate and desired/predetermined degassing performance.

Figure 8:
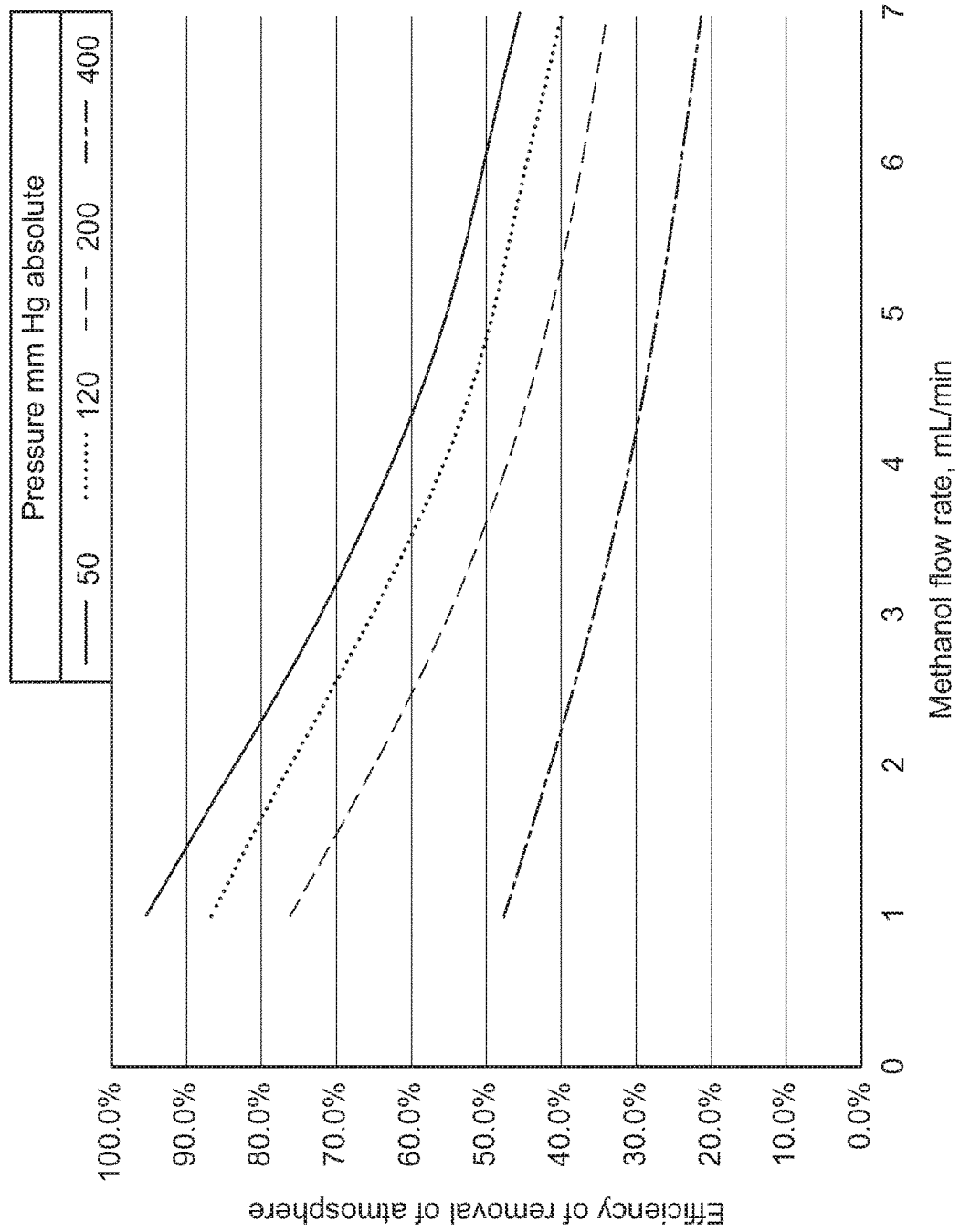
FIG. 8 is a chart showing calibration curves of degassing chamber efficiency against mobile phase flow rates.

To fully calibrate the test degassing module, absorbance data is preferably collected across a flow rate range and across a range of permeate side pressures. An example test method plots calibration data at four pressure levels (50, 120, 200, 400 mm Hg) and seven flow rates (1-7 ml/minute). FIG. 8 is a chart showing calibration curves from the calibration data taken across the various permeate side pressures and retentate side fluid flow rates. The calibration curves represent efficiencies for a selected degassing module that would be expected to be one of a set of one or more substantially identical degassing modules installed in an HPLC system having substantially identical physical and performance characteristics, all of which degassing modules would therefore be expected to perform similarly. By way of example, the tested degassing module exhibits a performance of 30% residual air (70% efficiency) when operated at 50 mm Hg at the permeate side of the chamber, and with a fluid flow rate through the retentate side of the chamber at about 3.5 ml/minute. Such performance would sufficiently degas a gradient or any isocratic low pressure-mixed methanol-water system up to about 7 ml/min because the calibration curve of FIG. 8 represents a single-channel degasser.

Figure 9:
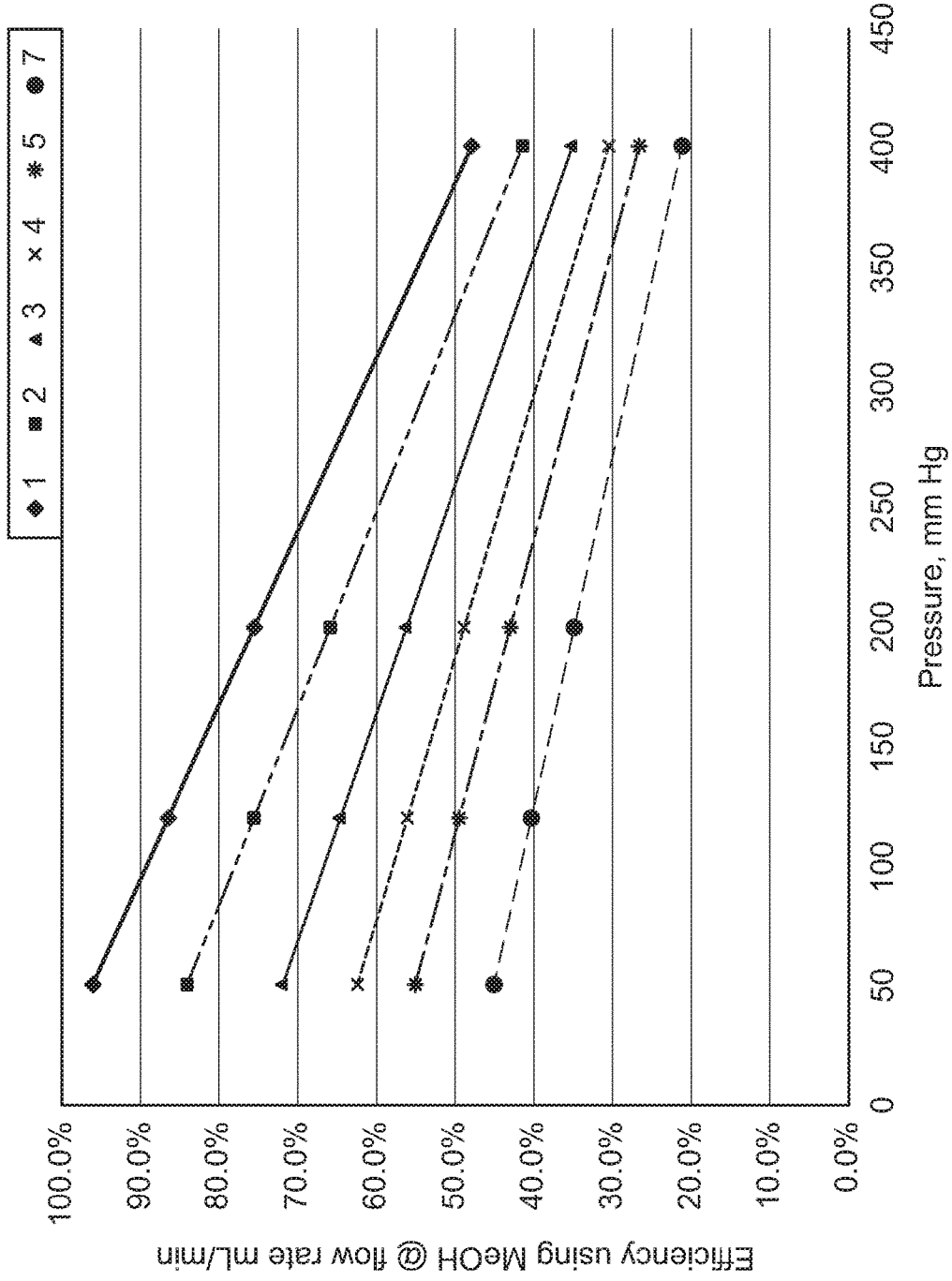
FIG. 9 is a chart showing calibration curves of degassing chamber efficiency against degassing chamber pressure levels.

The calibration data reflected in FIG. 8 may be re-plotted as shown in FIG. 9 to determine the tested degassing module efficiency over a range of permeate-side pressures, and over a range of mobile phase flow rates. Permeate side pressures of between 50-400 mm Hg absolute pressure was chosen simply in this example to cover the range of pressures which are generally available from a vacuum pumping system used in HPLC degassing. With this chart, any efficiency may be predetermined or chosen by the operator, and the appropriate permeate side pressure set point for a variety of mobile phase flow rates may be determined. In some embodiments, a set of efficiencies may be predetermined or selected depending upon, for example, whether the degassing module or set of degassing modules in an HPLC system is installed in a high pressure or low pressure mixing HPLC system. Other system design or degassing program characteristics may also impact or define the set of efficiencies.

The calibration data from the example tested degassing module is set forth below in Table 1, indicating the degassing efficiencies at the various permeate side pressures and mobile phase flow rates tested:

TABLE 1

Analysis of High efficiency degassing chamber
Efficiency using MeOH @ flow Rate mL/min

| Permeate side pressure, mm Hg | 1 | 2 | 3 | 4 | 5 | 7 |
|---|---|---|---|---|---|---|
| 50 | 95.4% | 83.7% | 71.9% | 62.8% | 55.3% | 45.5% |
| 120 | 86.6% | 76.3% | 65.3% | 55.9% | 49.2% | 40.0% |
| 200 | 75.9% | 65.2% | 54.9% | 47.3% | 41.3% | 33.7% |
| 400 | 47.6% | 41.5% | 35.5% | 31.1% | 27.0% | 21.3% |

When plotted, the slopes and intercepts for each line/curve may be determined. The slope line and intercept may then be used to calculate a permeate-side pressure needed to achieve any given efficiency at a given mobile phase flow rate. In other words, the rate of change of efficiency versus permeate-side pressure may be obtained for each mobile phase flow rate. The interim values in Table 1 permit the system operator or manufacturer to specify the level of performance needed for any given degassing system or application, and therefrom determine the calibration curves associated with mobile phase flow rate and permeate-side pressure to meet the selected degassing performance/efficiency. Typically, operators and manufacturers specify the efficiency to be 62% or greater, pursuant to the Tokunaga data. The assigned efficiency may include a default value, such as 62%, so that input of efficiency demands is not required.

TABLE 2

| X: Flow rate | 1 | 2 | 3 | 4 | 5 | 7 |
|---|---|---|---|---|---|---|
| m: Slope | −0.00137 | −0.00122 | −0.00105 | −0.0009 | −0.00081 | −0.00069 |
| b: intercept | 1.028158 | 0.900941 | 0.770763 | 0.666476 | 0.587574 | 0.483595 |

Table 2 sets forth line slopes for efficiency at each of the tested flow rates. The line slopes provide the rate of change of degassing efficiency versus permeate-side pressure. A permeate-side pressure for target degassing efficiency may be plotted using the formula:

pressure=(target efficiency−$b$)/$m$;

Where: $b$=intercept
$m$=slope

With the above data and a targeted degassing efficiency (Y), a single calibration curve may be calculated wherein a constant residual gas concentration versus flow rate may be retained. The calibration curve describes the performance characteristic of the tested degassing module, and is the basis for the control parameter utilized by the control system of the present invention to assign a permeate side pressure that will achieve a set point degassing efficiency at a known mobile phase flow rate.

Figure 10:
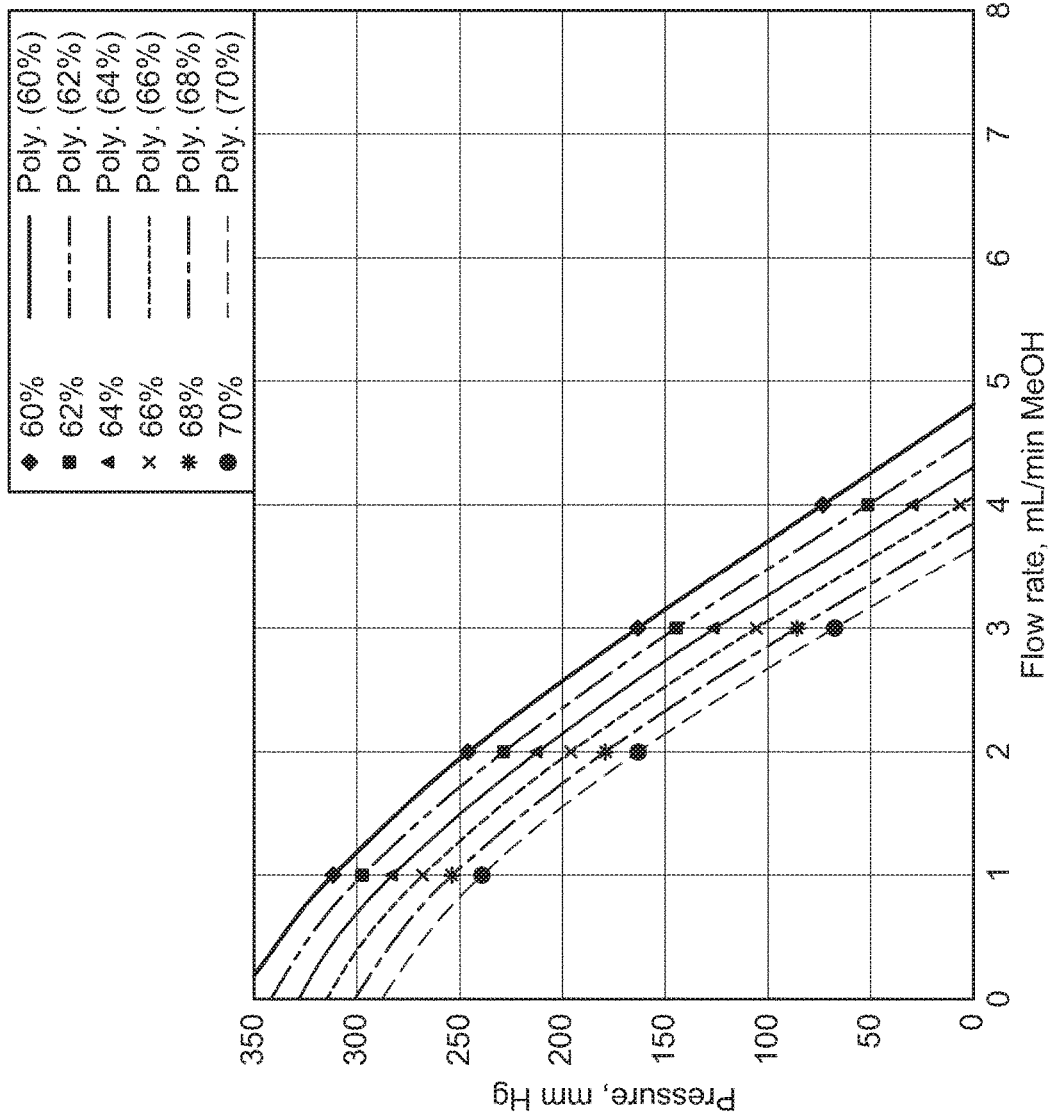
FIG. 10 is a chart showing efficiency calibration curves.

A family of calibration curves utilizing the line slopes and intercepts from Table 2 may be obtained from a selection of degassing efficiencies (Y). An example chart showing the efficiency calibration curves for the tested degassing module is set forth in FIG. 10. Each fixed efficiency curve may be represented by a single formula by further deriving the formula for the curve and the intercept. A practical limit on the applicability of the efficiency curve exists where the vacuum pump is not capable of achieving the required permeate side pressure, or that outgassing of inadequately degassed mobile phase could occur. The flow rate used in the chart represents one channel of flow, so that in the event two channels of flow are mixed, as in a pump-mixed isocratic mobile phase or as in a gradient blend, the total mobile phase flow rate may be divided by two before the permeate side pressure set point is identified. Through this data, one or more control parameters may be assigned for the degassing module tested, as well as for all degassing modules that are substantially identical to the tested degassing module. In that case, only one degassing module need be tested and calibrated for all degassing modules having substantially the same degassing characteristics to be similarly controlled with the same set of one or more control parameters. For the purposes hereof, the term "control parameter" is intended to mean the degassing efficiency calibration data and formulas developed through the calibration testing of a degassing module, and as illustrated in FIG. 10. The set of one or more control parameters may be entered into, for example, a firmware database 60 on HPLC system 10, thereby allowing the HPLC system to automatically calculate the appropriate permeate-side pressure level wherein the highest degassing pressure required may be automatically assigned. In the instance where an on-board system does not have control of the vacuum degassing pump, any of the control parameters may be stored, for example, in the vacuum degassing control board itself, or anywhere communicatively linked to the vacuum pump controller.

Figure 11:
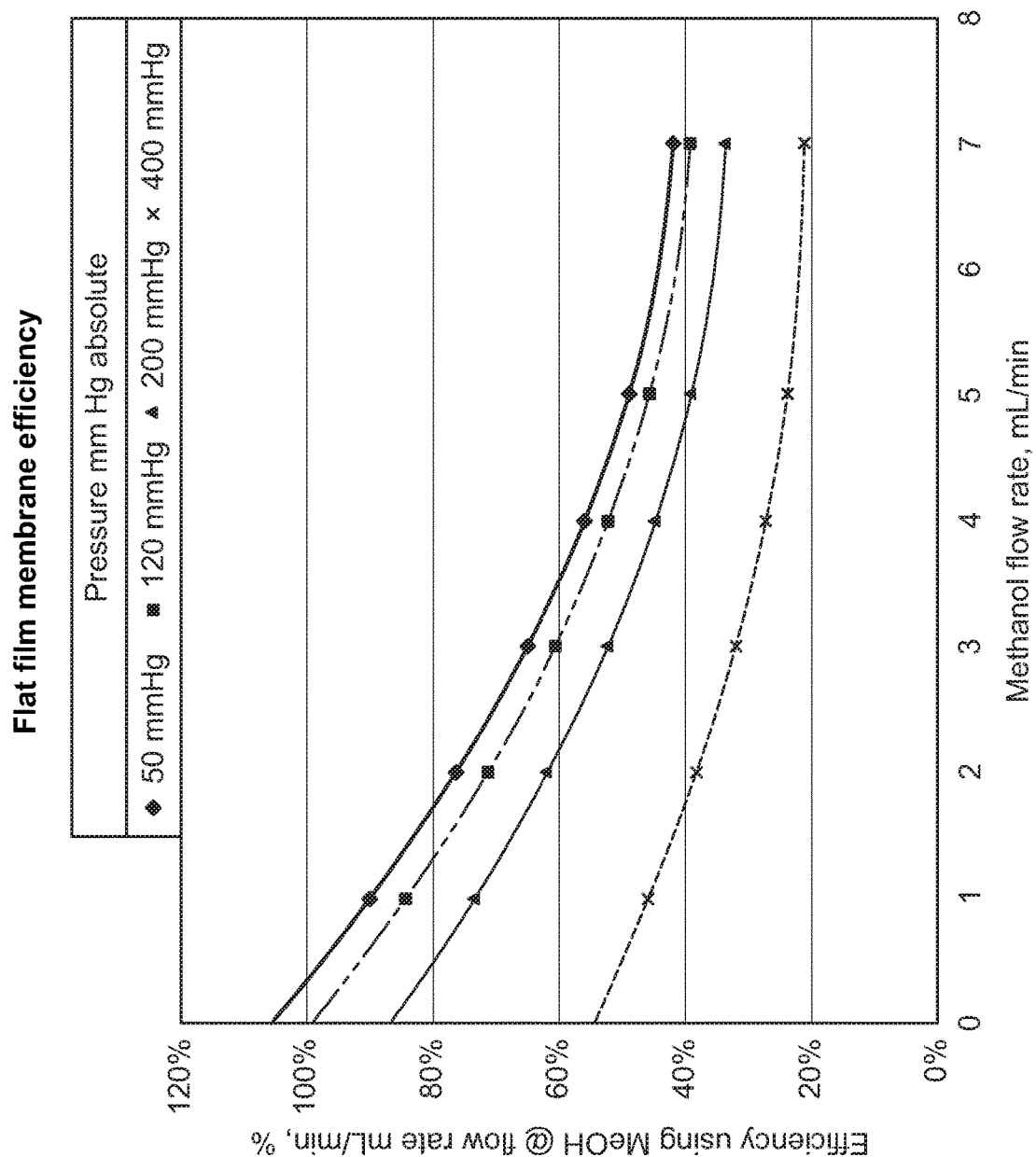
FIG. 11 is a chart showing calibration curves of degassing chamber efficiency against mobile phase flow rates.
Figure 12:
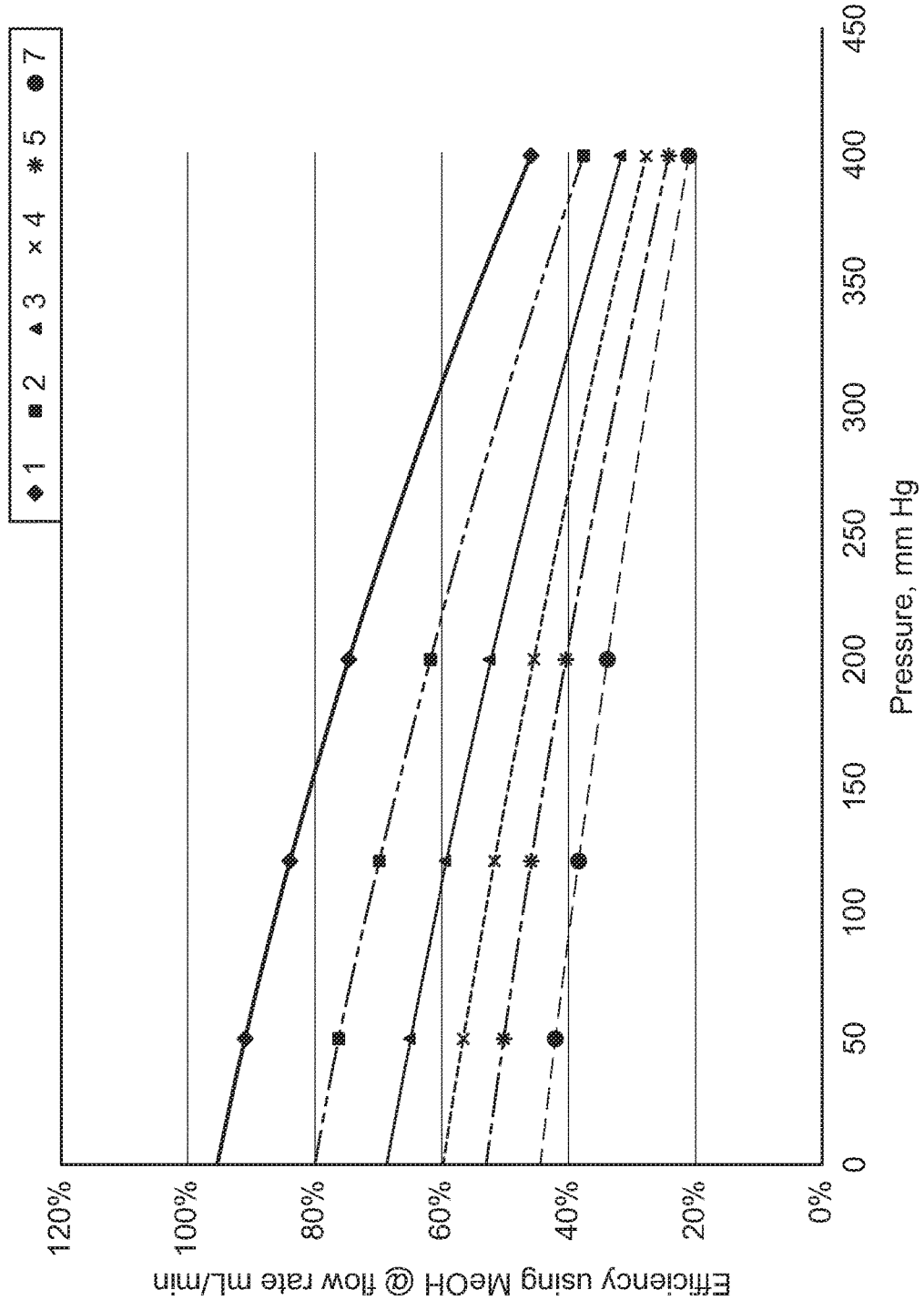
FIG. 12 is a chart showing calibration curves of degassing chamber efficiency against degassing chamber pressure levels.

It is to be understood that the calibration method and automated control may be equally applicable to flat film-type degassing modules. FIG. 11 represents calibration curves of efficiency versus mobile phase flow rate at four different permeate-side pressures. This data may once again be interpreted such that gassing efficiency is plotted against the permeate-side pressure at each tested mobile phase flow rate. This analysis for a particular flat-film type degasser is depicted in FIG. 12. Curve analysis on the plotted calibration data in FIG. 12 results in the expressions set forth in Table 3 below representing the rate of change in efficiency against the permeate side pressure for each of the analyzed flow rates.

TABLE 3

| quadratic coefficients | Flow Rate | | | | | |
|---|---|---|---|---|---|---|
| | 1 | 2 | 3 | 4 | 5 | 7 |
| a: $X^2$ | −1.02E−06 | −7.28E−07 | −4.90E−07 | −4.62E−07 | −4.37E−07 | −2.70E−07 |
| b: X | −8.25E−04 | −7.78E−04 | −7.26E−04 | −6.15E−04 | −5.43E−04 | −4.79E−04 |
| c | 9.53E−01 | 8.03E−01 | 6.86E−01 | 5.60E−01 | 5.30E−01 | 4.44E−01 |

The formula for each line then is used to calculate the permeate-side pressure corresponding to a selected efficiency at any mobile phase flow rate. In the test case flat film degasser, the curve fit is a second order polynomial from which the permeate-side pressure at a fixed desired efficiency may be calculated for each flow rate following the formula: $Y=ax^2+bx+c$ where Y is the efficiency and X is the mobile flow rate corresponding to the data. The result of the calculations for the flow rates associated with the calibration data produces the set of calibration curves illustrated in FIG. 13.

Figure 13:
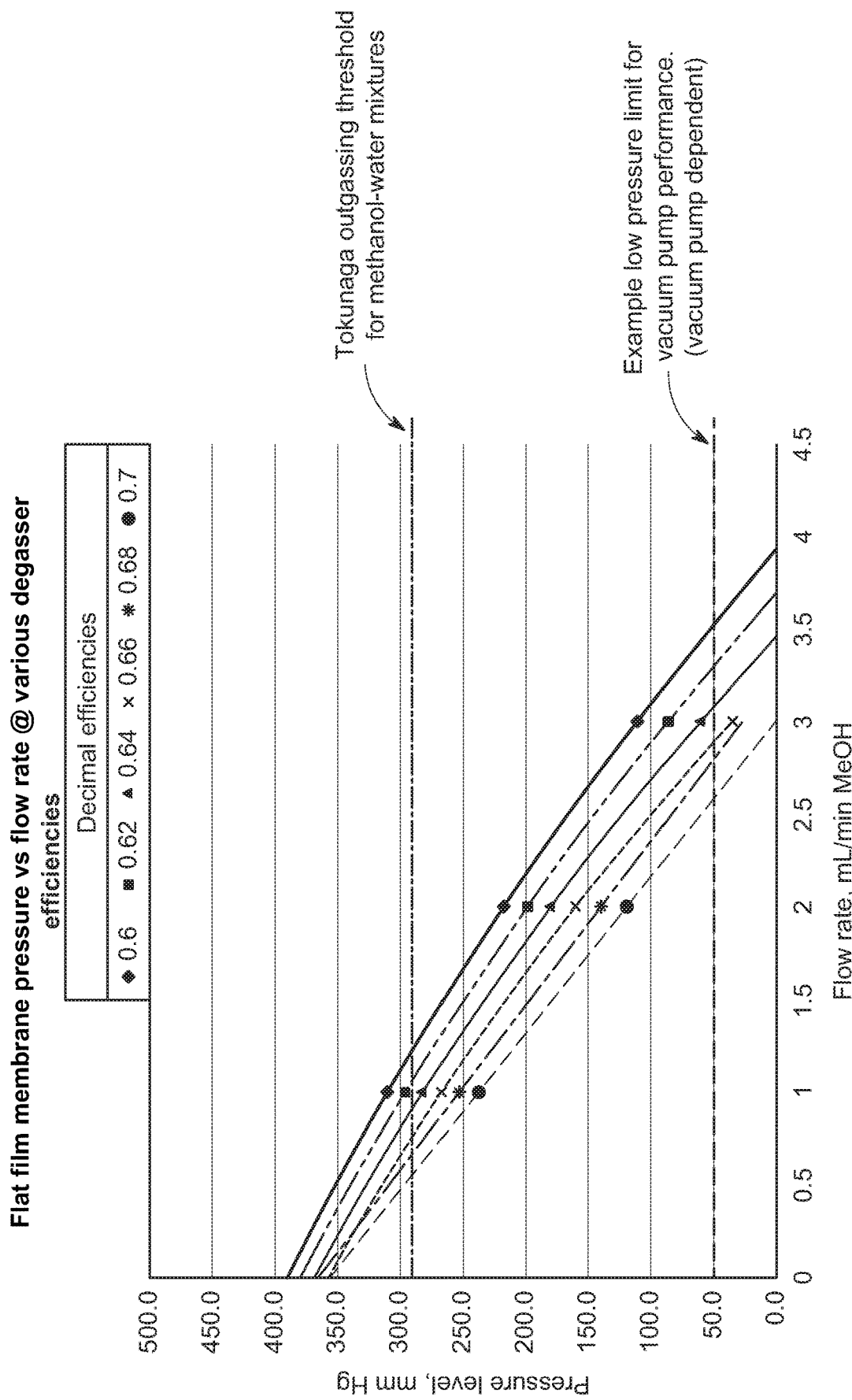
FIG. 13 is a chart showing efficiency calibration curves.

Graphical evaluation of the calibration curves of FIG. 13 results in the following set of formulas from which a maximum permeate-side pressure may be determined to meet a given degassing efficiency for the system.

TABLE 4

| Target Efficiency | Curve formulas for given efficiencies where X is pressure |
|---|---|
| 60% | $y = -6.6219x^2 - 73.102x + 389.49$ |
| 62% | $y = -7.1972x^2 - 76.021x + 379.11$ |
| 64% | $y = -8.1173x^2 - 78.003x + 367.87$ |
| 66% | $y = -8.7408x^2 - 81.196x + 357.24$ |
| 68% | $y = -112.72x + 365.26$ |
| 70% | $y = -118.32x + 355.75$ |

Solving for the permeate side pressure (Y) is accomplished by inputting into the equation table the target efficiency and the mobile phase flow rate. The permeate-side pressure calculated according to such control parameters represents the maximum pressure level at the permeate side of the degassing chamber that will nevertheless establish a sufficient driving force to meet the target degassing efficiency at the operational flow rate. The control parameter of the present invention may incorporate a set of one or more calibration curves, such as those described in FIG. 13. The controller may then employ the formulas underlying the calibration curves to define the maximum permeate-side pressure appropriate for any given degassing efficiency and mobile phase flow rate within the capabilities of the degassing system. Such a determined pressure may fluctuate with fluctuating efficiency targets and/or mobile phase flow rates.

Figure 14:
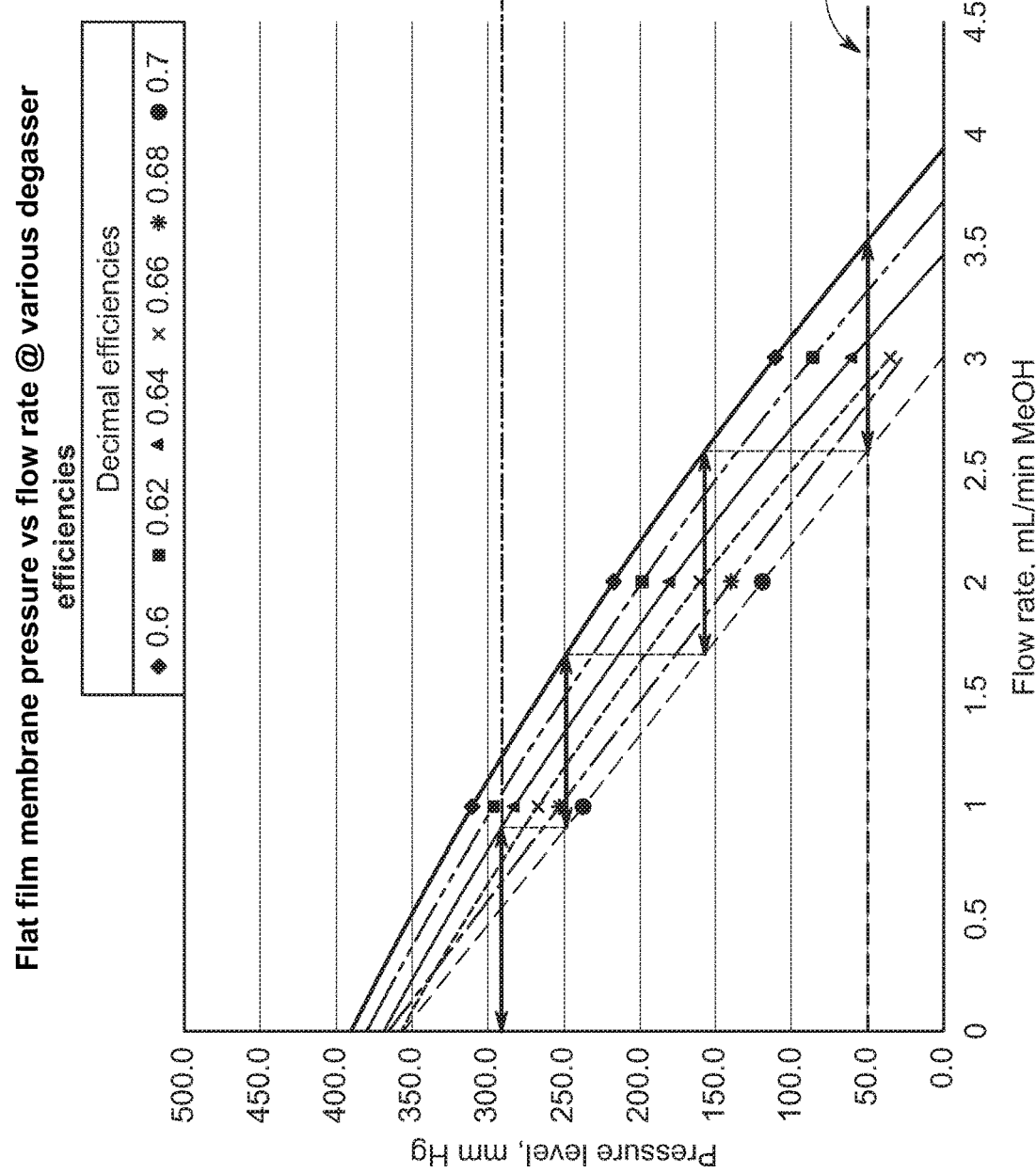
FIG. 14 is a chart showing efficiency calibration curves.

In some embodiments, a permeate side pressure may be defined so that the control parameter may be used to determine a range of fluid flow rates that will not exceed the degassing system's capacity to adequately degas the fluid. An example approach is illustrated in FIG. 14, wherein the degassing module calibrated efficiencies are plotted for fluid flow rate against permeate side pressure. Permeate side pressure set points are illustrated by the double-ended arrows between example efficiencies of 60-70%. The double-ended arrows represent the fluid flow rate ranges that can be suitably degassed by the respective degassing chamber at various assigned permeate side pressures. As may be seen in FIG. 14, higher degassing efficiencies trend to the left side of the plot corresponding with lower mobile phase flow rates.

Figure 15:
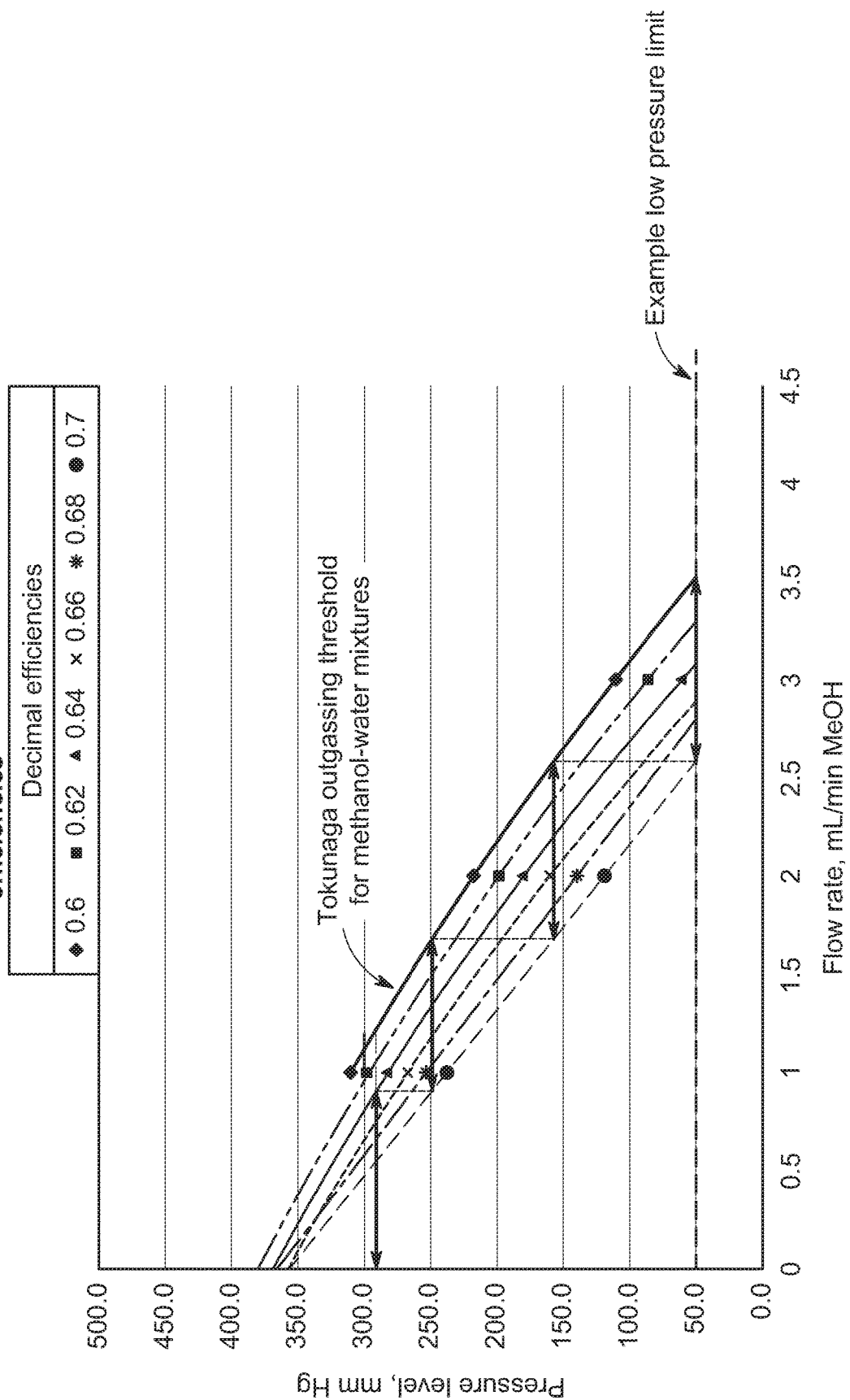
FIG. 15 is a chart showing efficiency calibration curves.

A permeate side pressure set point may also be assigned for all anticipated mobile phase flow rates through the retentate side of the chamber, up to a maximum flow rate value. In this case, efficiency will vary with change in flow rate. The calibration data and curves, however, may be utilized to define the maximum flow rate at an assigned permeate side pressure that nevertheless meets a target degassing efficiency, such as an efficiency suitable to avoid outgassing at atmospheric pressure. FIG. 15 illustrates an outgassing efficiency line ("Tokunaga Outgassing Threshold"), wherein the maximum flow rate value for selected permeate side pressures is the intercept of the respective double-ended arrows with the Tokunaga Outgassing Threshold. In this regard, a degassing module designer may assign a maximum mobile phase flow rate for the system, and use the control parameter of the present invention to assign or control the permeate side pressure to a level at which suitable degassing performance is assured.

A further use of the control parameter of the present invention may be in the design of the degassing module itself. In the case that both a maximum or set point mobile phase flow rate and a permeate side pressure set point may be defined, the characteristics of the degassing module may be adjusted to exhibit the minimum efficiency required to meet the flow rate and pressure set points. Example module characteristics that may be adjusted include volume of the chamber, contact area of the membrane, and performance of the membrane (via membrane thickness, material, or arrangement).

It should be understood that permeate-side pressures exceeding approximately 288 mm Hg (atmospheric pressure 760 mm Hg)*(maximum air concentration in methanol/water w/o outgassing (38%)) are not typically useful for vacuum degassing applications, since the likelihood of outgassing increases above this pressure level. In some embodiments, therefore, a predetermined/assigned upper limit of about 280 mm Hg is defined in the control parameter for the permeate-side pressure. However, vacuum degassing performed at atmospheric pressures substantially different from standard pressure (760 mm Hg) may require an adjustment in the calculation of the local outgassing threshold pressure, which may be significantly less than 280 mm Hg.

Figure 16:
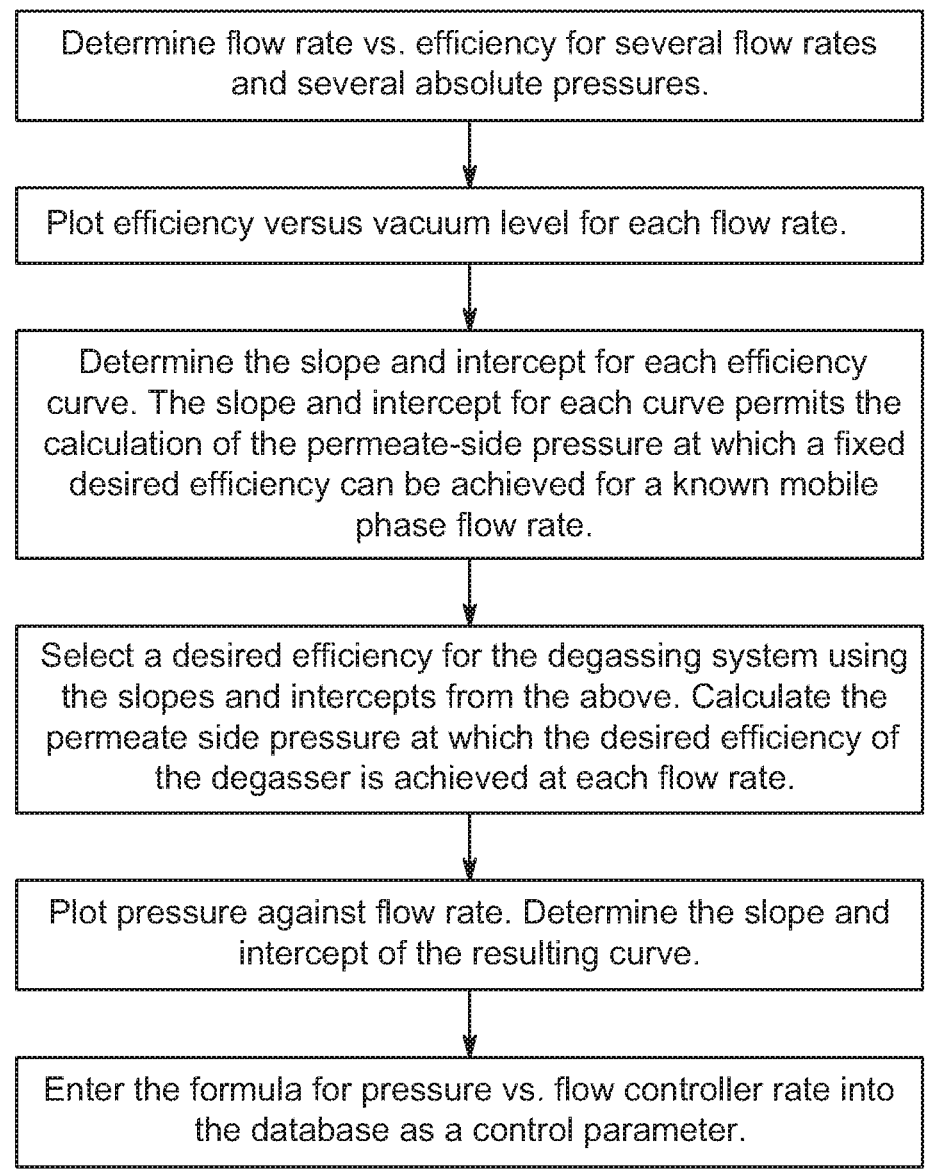
FIG. 16 is a flow diagram for the development of a control parameter.

A flow diagram of the steps taken for the calibration of a degassing module, and the development of calibration curves to support a control parameter is shown in FIG. 16.

Figure 17:
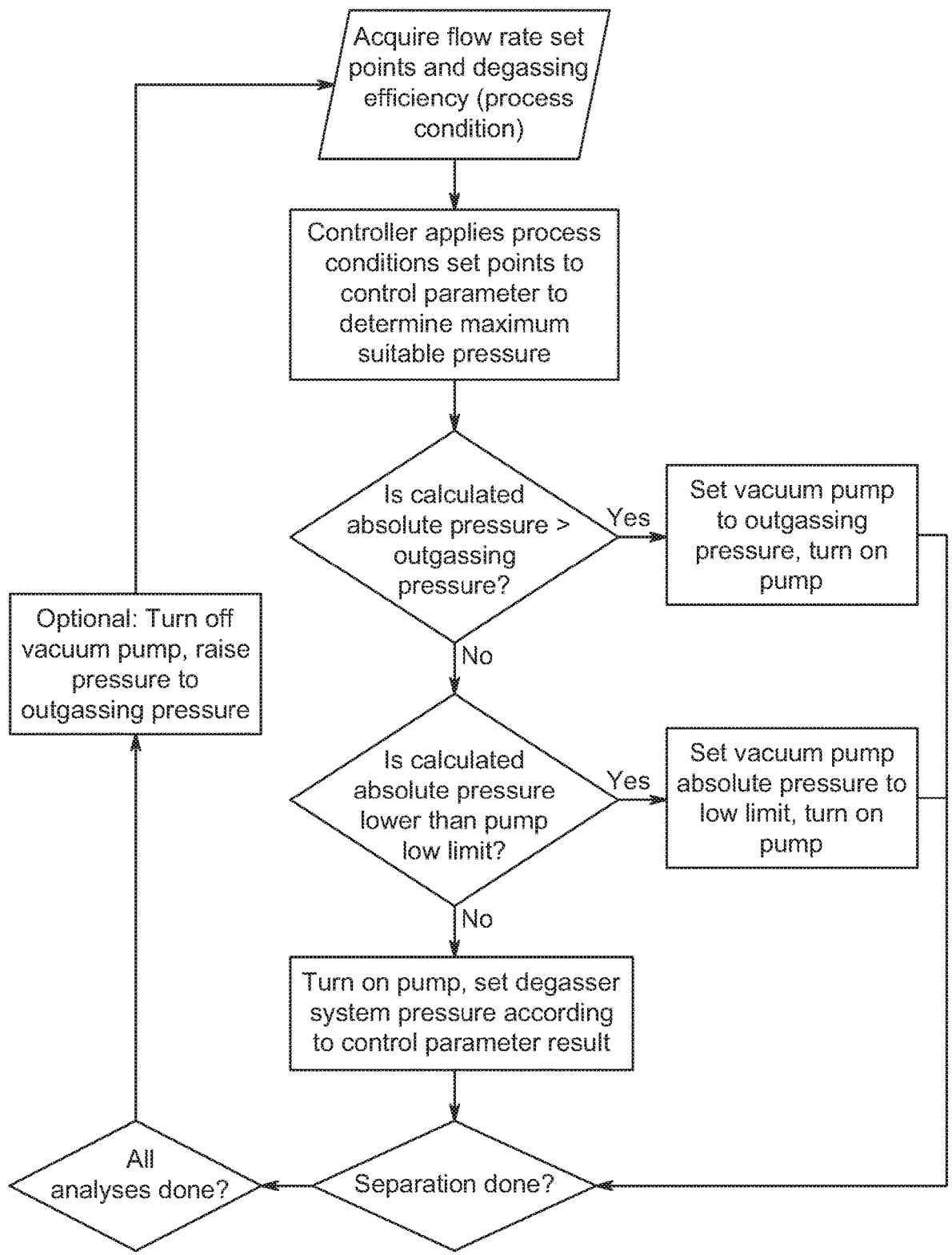
FIG. 17 is a flow diagram depicting a fluid degassing control system of the present invention.

FIG. 17 is a flow diagram representing the present control scheme wherein the control system establishes a permeate-side pressure in each degassing chamber that is appropriate to ensure a suitable degassing driving force to achieve the assigned or predetermined degassing efficiency at the assigned or predetermined mobile phase flow rate. Such permeate-side pressure may be maintained by the control system throughout the chromatographic separation or until mobile phase flow rate set point is changed.

It should be understood that calculating the amount of dissolved air in a solvent is related to atmospheric pressure. The chart illustrated in FIG. 1, for example, assumes standard temperature and pressure. In situations wherein degassing is to be performed at atmospheric pressures that substantially deviate from standard atmospheric pressure, a calibration for local atmospheric pressure should be included in the control system in the present invention. In the case of pressure sensors in a degassing channel, it is common that such sensors relate sensed pressured to absolute zero pressure, rather than atmospheric pressure. Consequently, an outgassing threshold expressed as absolute pressure should be adjusted by the relationship between the local atmospheric pressure and standard atmospheric pressure. In some embodiments of the present controlled scheme, therefore, a local atmospheric pressure adjustment may be included by acquiring the local atmospheric pressure "$P_L$", and calculating an atmospheric adjustment factor by:

$$F = P_L / P_S$$

wherein:
F=atmospheric adjustment factor
$P_L$=local atmospheric pressure
$P_S$=standard atmospheric pressure The local outgassing pressure threshold "$P_o$" may then be determined by:

$$P_O = P_T * F$$

wherein:
$P_T$=the threshold outgassing pressure at standard atmospheric pressure
F=the atmospheric adjustment factor For those experienced in the art, a gradient system operating at a fixed flow rate exhibits a total flow rate wherein the composition of the mobile phase passing through the HPLC separation column varies with time. This time-based composition variation in concentration is achieved by varying the mobile phase flow rate through each degassing channel in proportion to the desired make-up of the composition at any one time. Under gradient conditions, a best practice may be to set the permeate-side pressure for all degassing modules in accordance to the total flow rate for the separation.

In cases wherein a single mixture of mobile phase is made up for low-pressure mixing HPLC using a peroration valve upstream from a pump inlet check valve, or for high pressure mixing HPLC systems, the permeate-side pressure level should be set using the separation flow rate and the highest initial dissolved gas concentration supplied to the degassing modules.

It is to be contemplated that the present system may be equally applicable to scenarios in which mobile phase flow rate varies with time, target or supply residual dissolved gas varies with time, or both. In all circumstances, the control parameter may be utilized to direct a maximum permeate-side pressure that nevertheless meets the assigned or predetermined degassing efficiency. In some cases, such pressure may prevent outgassing that could occur due to mixing at atmospheric pressure, and may also prevent pervaporation, including pervaporative degradation of mixtures in a single mobile phase passing through a single degassing channel.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

What is claimed is:

1. A fluid degassing system, comprising:
a degassing module having a chamber and a gas-permeable membrane forming a non-porous barrier separating said chamber into a retentate side and a permeate side, said degassing module including a fluid inlet port and a fluid outlet port each fluidically connected to the retentate side of said chamber, and an exhaust port fluidically connected to the permeate side of said chamber;
a vacuum pump fluidically connected to said exhaust port for evacuating the permeate side of said chamber;
a fluid pump fluidically connected to at least one of said fluid inlet port and said fluid outlet port for motivating a fluid through the retentate side of said chamber at an adjustable fluid flow rate;
an input means including a user interface for inputting one or more process condition values including a degassing efficiency parameter value; and
a control system communicatively linked to said input means and said vacuum pump, said control system including a pressure sensor arranged to sense a pressure of the permeate side of said chamber, a database storing calibration data defining permeate side pressure set point levels that achieve degassing efficiency parameters at respective fluid flow rates, wherein the calibration data is specific to the particular degassing module, the control system further including a processor programmed to apply a user inputted degassing efficiency parameter value and the fluid flow rate to the calibration data to dynamically determine a maximum pressure value for the permeate side of said chamber as a calculated pressure set point that nevertheless permits the degassing efficiency parameter value to be met through solution-diffusion gas transfer through the non-porous barrier, the degassing efficiency parameter being defined by at least one of a degassing efficiency and a residual gas concentration, with the degassing efficiency being defined by:
e=100% - % residual gas
wherein: e=degassing efficiency; and
% residual gas = the amount by weight of gas in the fluid after degassing divided by the amount by weight of gas in the fluid at saturation, each measured at the same pressure, said control system being adapted to generate and deliver a pressure control signal to said vacuum pump to seek a permeate side pressure equal to the pressure set point.

2. A fluid degassing system as in claim 1 wherein calibration data is specific to a class of degassing modules that have substantially identical performance characteristics, wherein said degassing module is represented by the class of degassing modules.

3. A fluid degassing system as in claim 2 wherein the calibration data yields a calibration formula.

4. A fluid degassing system as in claim 1 wherein the pressure control signal controls an operation speed of said vacuum pump.

5. A fluid degassing system as in claim 4 wherein said control system defines the pressure control signal based on the calculated pressure set point and feedback from said pressure sensor.

6. A fluid degassing system as in claim 1 wherein the control system is communicatively linked to said fluid pump and is adapted to generate a flow rate control signal to said fluid pump to maintain the fluid flow rate process condition value.

7. A fluid degassing system as in claim 1 wherein the control system includes a vacuum pump controller having a processor and a signal generator responsive to feedback from said pressure sensor and the calculated pressure set point.

8. A fluid degassing system as in claim 7 wherein said signal generator of said vacuum pump controller generates and delivers the pressure control signal to said vacuum pump.

9. A fluid degassing system as in claim 1, including a plurality of degassing modules, each fluidically connected to an exhaust manifold through respective said exhaust ports, and wherein said vacuum pump is fluidically connected to said exhaust manifold.

10. A fluid degassing system as in claim 1 wherein the pressure set point represents the maximum pressure at the permeate side of said chamber that nevertheless prevents outgassing upon mixing of the fluid with another fluid at atmospheric pressure.

11. A fluid degassing system as in claim 1 wherein the pressure set point is not less than the lowest permeate side pressure achievable by the fluid degassing system.

\* \* \* \* \*